(12) United States Patent
Miki

(10) Patent No.: US 10,771,150 B2
(45) Date of Patent: Sep. 8, 2020

(54) PARALLEL PROCESSING APPARATUS AND REPLACING METHOD OF FAILING OPTICAL TRANSMISSION LINE

(71) Applicant: FUJITSU LIMITED, Kawasaki-shi, Kanagawa (JP)

(72) Inventor: Atsushi Miki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/589,580

(22) Filed: Oct. 1, 2019

(65) Prior Publication Data

US 2020/0119809 A1  Apr. 16, 2020

(30) Foreign Application Priority Data

Oct. 16, 2018  (JP) ................................. 2018-195338

(51) Int. Cl.
*H04B 10/03* (2013.01)
*H04B 10/079* (2013.01)
*H04Q 11/00* (2006.01)

(52) U.S. Cl.
CPC ......... *H04B 10/03* (2013.01); *H04B 10/0791* (2013.01); *H04B 10/0795* (2013.01); *H04Q 11/0066* (2013.01); *H04Q 2011/0081* (2013.01); *H04Q 2011/0086* (2013.01)

(58) Field of Classification Search
None
See application file for complete search history.

(56) References Cited

U.S. PATENT DOCUMENTS

| | | | | |
|---|---|---|---|---|
| 5,793,510 A | * | 8/1998 | Samejima | ............. H04L 7/0008 398/154 |
| 6,879,559 B1 | * | 4/2005 | Blackmon | ............... H04L 45/00 370/216 |
| 8,355,318 B2 | * | 1/2013 | Kawaguchi | ........... H04L 12/437 370/222 |

(Continued)

FOREIGN PATENT DOCUMENTS

| | | |
|---|---|---|
| JP | 2004-088570 | 3/2004 |
| JP | 2012-074841 | 4/2012 |
| JP | 2014-183482 | 9/2014 |

*Primary Examiner* — Li Liu
(74) *Attorney, Agent, or Firm* — Staas & Halsey LLP

(57) ABSTRACT

A parallel-processing apparatus has information-processing apparatuses coupled mutually through an optical transmission line having channels. Each of the information-processing apparatuses has processors allocated to the channels of the optical transmission line, a controller and a display. When one of the processors detects a channel failure, the processor notifies a processor in the other information-processing apparatus of the channel failure, notifies the controller of the information-processing apparatus of the channel failure and notifies the controller of the information-processing apparatus of the notification of the channel failure from the other information-processing apparatus. The controller causes the processor of the information-processing apparatus to stop use of the failing optical transmission line based on reception of the notification of the channel failure and sets the display corresponding to the failing optical transmission line to have a stop indication state indicating that communication through the optical transmission line has stopped.

10 Claims, 15 Drawing Sheets

(56) References Cited

U.S. PATENT DOCUMENTS

| | | | |
|---|---|---|---|
| 2004/0073648 A1 | 4/2004 | Tanino et al. | |
| 2008/0232818 A1* | 9/2008 | Narita | H04J 3/1611 398/164 |
| 2009/0307568 A1* | 12/2009 | Takaku | H04L 1/0041 714/807 |
| 2010/0124417 A1* | 5/2010 | Kawaguchi | H04L 12/437 398/3 |
| 2014/0286634 A1 | 9/2014 | Tsuiki | |
| 2017/0093484 A1* | 3/2017 | Schmidt | H04J 14/0297 |

* cited by examiner

PARALLEL PROCESSING APPARATUS AND REPLACING METHOD OF FAILING OPTICAL TRANSMISSION LINE

CROSS-REFERENCE TO RELATED APPLICATION

This application is based upon and claims the benefit of priority of the prior Japanese Patent Application No. 2018-195338, filed on Oct. 16, 2018, the entire contents of which are incorporated herein by reference.

FIELD

The embodiments discussed herein are related to a parallel processing apparatus and a replacing method of a failing optical transmission line.

BACKGROUND

In recent years, the transmission speed of information improves with an increased transmission capacity of information to be exchanged between computers such as information processing apparatuses. A method in which such computers are coupled by an optical fiber cable to communicate information to each other is becoming a mainstream. In this type of computer system, various measures are taken for reducing a communication stop period between the computers in order to suppress reduction of reliability.

For example, a plurality of interface circuits coupled to an optical transmission line is provided in each of a plurality of information processing apparatuses that communicate with each other via the optical transmission line so that communication therebetween is continued without stopping even when one of the interface circuits is faulty (see Japanese Laid-open Patent Publication No. 2014-183482, for example).

In a case where one of interface units of a server and a storage coupled with each other through a plurality of transmission lines is faulty, a management device stops communication using the transmission line coupled to the faulty device until the faulty device is repaired (see Japanese Laid-open Patent Publication No. 2004-88570, for example).

In a network device having a plurality of ports coupled with each other through a plurality of cables, when a failure of one of the ports is detected, the cable coupled to the port from which the failure is detected is unlocked. A lighting unit corresponding to the port from which the failure is detected is lighted on. Thus, improper cable removal and insertion may be suppressed when the corresponding cable is replaced for repair of the failure (see Japanese Laid-open Patent Publication No. 2012-74841, for example).

SUMMARY

According to an aspect of the embodiments, a parallel processing apparatus includes: information processing apparatuses coupled mutually through an optical transmission line having a plurality of channels, wherein each of the information processing apparatuses has a plurality of processors that shares the optical transmission line having the plurality of channels allocated to the plurality of processors; a controller coupled to the information processing apparatus; and a display provided correspondingly to the optical transmission line, wherein when a first processor of the plurality of processors detects a failure of a channel, the first processor notifies the channel failure to a second processor of the plurality of the processors of the another information processing apparatus by using a channel that is not failed, notifies the channel failure to the controller of the information processing apparatus and, when the first processor receives a notification of the channel failure from the another information processing apparatus, notifies the channel failure to the controller of the information processing apparatus, and wherein the controller of each of the information processing apparatuses detects a processor of the information processing apparatus using a failing optical transmission line including the failing channel based on reception of the notification of the channel failure, causes the detected processor to stop use of the failing optical transmission line, and, based on the stop of the use of the failing optical transmission line by the detected processor, sets the display corresponding to the failing optical transmission line to have a stop indication state indicating that communication through the failing optical transmission line has stopped.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, in a parallel processing apparatus having a plurality of information processing apparatuses each including a plurality of central processing units (CPUs), the information processing apparatuses are mutually coupled through an optical transmission line and execute processes in parallel. In this type of parallel processing apparatus, as the number of information processing apparatuses increases, that is, as the size of the system increases, the number of optical transmission lines that couple between the information processing apparatuses increases. With this, in a maintenance work for replacing a failing optical transmission line, it is difficult to find the optical transmission line to be replaced, and the possibility that wrong coupling occurs increases. As a result, there is a risk that the working time for the optical transmission line replacement increases.

In information processing apparatuses sharing an optical transmission line and each including a plurality of CPUs to which a predetermined number of channels are allocated, when one of the channels has a failure, the optical transmission line is replaced after the plurality of CPUs stops their processes. The CPUs stop their processes in each of the information processing apparatuses. A system manager who operates a management device that manages the parallel processing apparatus confirms that all CPUs using the optical transmission line to be replaced have stopped their processes, and the system manager instructs to replace the optical transmission line.

Hereinafter, embodiments will be described with reference to the drawings.

Figure 1:
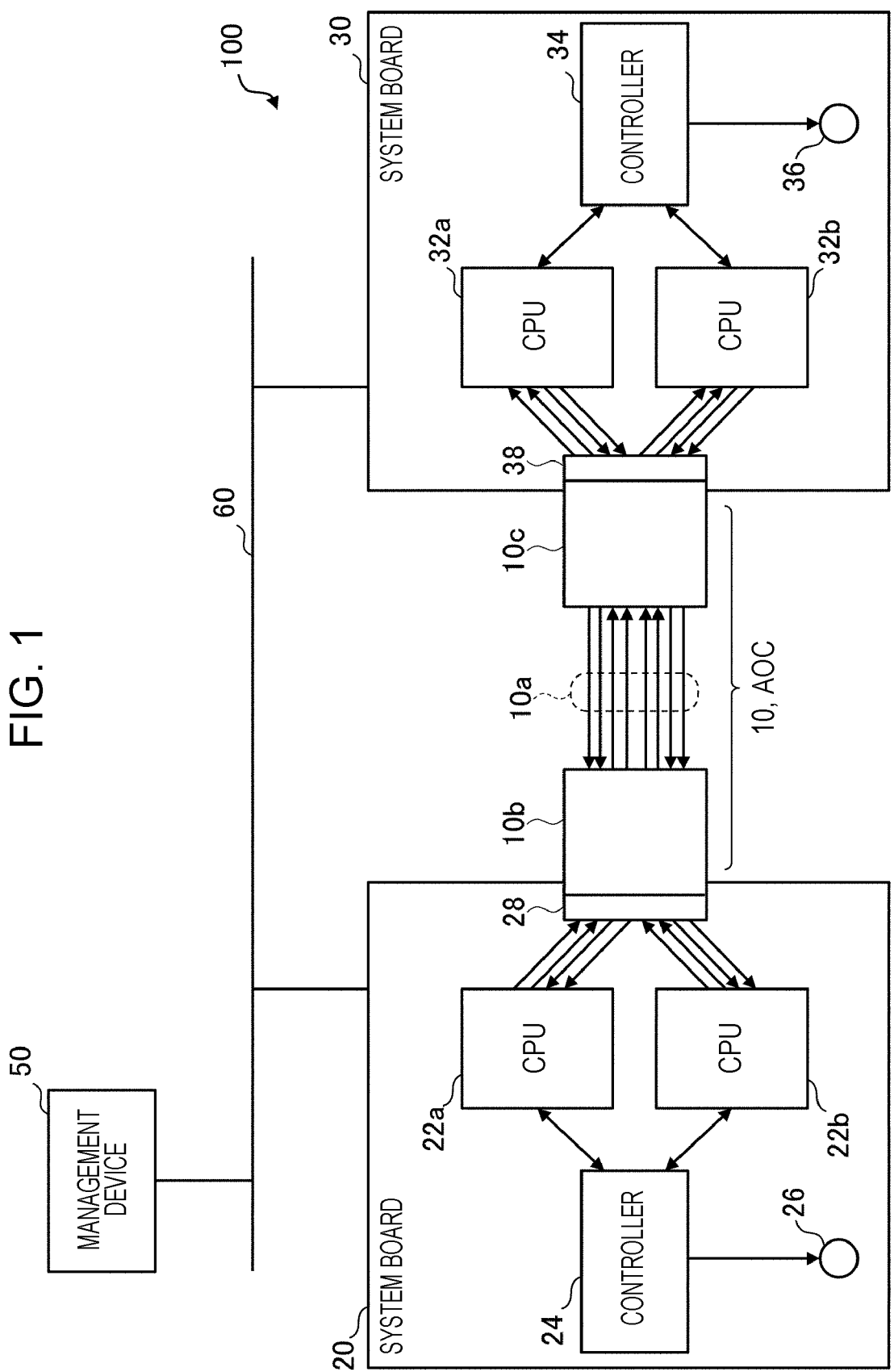
FIG. 1 is a diagram illustrating an example of a parallel processing apparatus according to an embodiment.

FIG. 1 is a diagram illustrating an example of a parallel processing apparatus according to an embodiment.

A parallel processing apparatus 100 illustrated in FIG. 1 has system boards 20 and 30 coupled mutually through an optical transmission line 10 having a plurality of channels. The optical transmission line may be an optical fiber cable or optical waveguides. The parallel processing apparatus 100 may have a plurality of the system boards 20 and 30. The system boards 20 and 30 may be a pair. The system board 20 has a plurality of CPUs 22 (22a, 22b), a controller 24, a display 26 and a coupler 28. The system board 30 has a plurality of CPU 32 (32a, 32b), a controller 34, a display 36, and a coupler 38. The system boards 20 and 30 are mutually coupled through the optical transmission line 10 coupled to the couplers 28 and 38.

The system boards 20 and 30 are coupled, over a network 60, for example, to a management device 50 such as a management server that manages the parallel processing apparatus 100 overall. CPUs 22a, 22b, 32a, and 32b are examples of a processor, and the controllers 24 and 34 are examples of a controller. Hereinafter, the CPUs 22 and 32 may sometimes be called "CPUs" if distinction between the CPUs 22 and 32 is not required.

The number of CPUs included in each of the system boards 20 and 30 may be higher than two. For example, in a case where each of the system boards 20 and 30 has four CPUs, the system boards 20 and 30 are coupled by two optical transmission lines 10. To each of the optical transmission lines 10, two CPUs 22 of the system board 20 and two CPUs 32 of the system board 30 are coupled.

The system boards 20 and 30 are examples of the information processing apparatus and are stored in a rack or a housing. The rack or housing may store a plurality of system boards 20 and 30. Each of the system boards 20 and 30 may have a main storage memory and a communication interface unit and so on in addition to the illustrated components.

For example, the CPUs may execute jobs in parallel. The CPUs may execute jobs in parallel together with another CPU, not illustrated. In other words, for example, the parallel processing apparatus 100 uses a plurality of CPUs to execute processes in parallel. Each of the CPUs may include a communication interface unit instead of a communication interface unit provided in each of the system boards 20 and 30. The CPUs share the optical transmission line 10, and a plurality of channels of the optical transmission line 10 is allocated to the CPUs. Though not particularly limited, the optical transmission line 10 is an active optical cable (AOC) having eight channels. Hereinafter, the optical transmission line 10 will also be called an "AOC 10".

The controller 24 controls operations of the CPUs 22a and 22b and controls display operations of the display 26. For example, when the controller 24 receives a channel failure notification indicating a failure of a channel from one of the CPUs 22 and when the other one of the CPUs 22 communicates through the AOC 10, the controller 24 causes the other one of the CPUs 22 to stop the communication using the AOC 10. The controller 24 further outputs to the management device 50 information indicating a state within the system board 20 such as operating states of the CPUs 22.

Also, the controller 34 controls operations of the CPUs 32a and 32b and controls display operations of the display 36. For example, when the controller 34 receives a channel failure notification indicating a failure of a channel from one of the CPUs 32 and when the other one of the CPUs 32 communicates through the AOC 10, the controller 34 causes the other one of the CPUs 32 to stop the communication using the AOC 10. The controller 34 further outputs to the management device 50 information indicating a state within the system board 30 such as operating states of the CPUs 32.

The display 26 (36) includes a light emitting diode (LED), for example, that is set to a light-on state, a light-off state or a blinking state under control of the controller 24 (34). The display 26 (36) is provided correspondingly to each AOC 10. For example, when the system board 20 has four CPUs 22 and is coupled to two AOCs 10, the system board 20 has the display 26 for each of the AOCs 10. Also, when the system board 30 has four CPUs 32 and is coupled to two AOCs 10, the system board 30 has the display 36 for each of the AOCs 10. Hereinafter, the displays 26 and 36 will be called "LEDs 26 and 36". Instead of such an LED, each of the displays 26 and 36 may include a lamp such as a light bulb or may include other types of light emitter.

In FIG. 1, the LED 26 and the coupler 28 are far away from each other, and the LED 36 and the coupler 38 are far away from each other. However, in reality, the LED 26 and the coupler 28 are placed at positions neighboring to each other over the system board 20, and the LED 36 and the coupler 38 are placed at positions neighboring to each other over the system board 30. Thus, as will be described below, a maintenance staff may recognize with which AOCs 10 the LEDs 26 and 36 are associated at a glance so that occurrence of improper removal and improper insertion of the AOC 10 may be suppressed.

In a case where each of the CPUs 22 and 32 is coupled to a plurality of system boards through a plurality of AOCs 10, the communication interface unit corresponding to each of the CPUs 22 and 32 may have a router. Thus, a computer network (interconnect) having the CPUs 22 and 32 as nodes may be constructed. The interconnect may be constructed by using an AOC 10 and an electric cable together. In this case, preferably, nodes with a relatively long communication distance are coupled by using the AOC 10, and nodes with a relatively short communication distance are coupled by using the electric cable.

Figure 2:
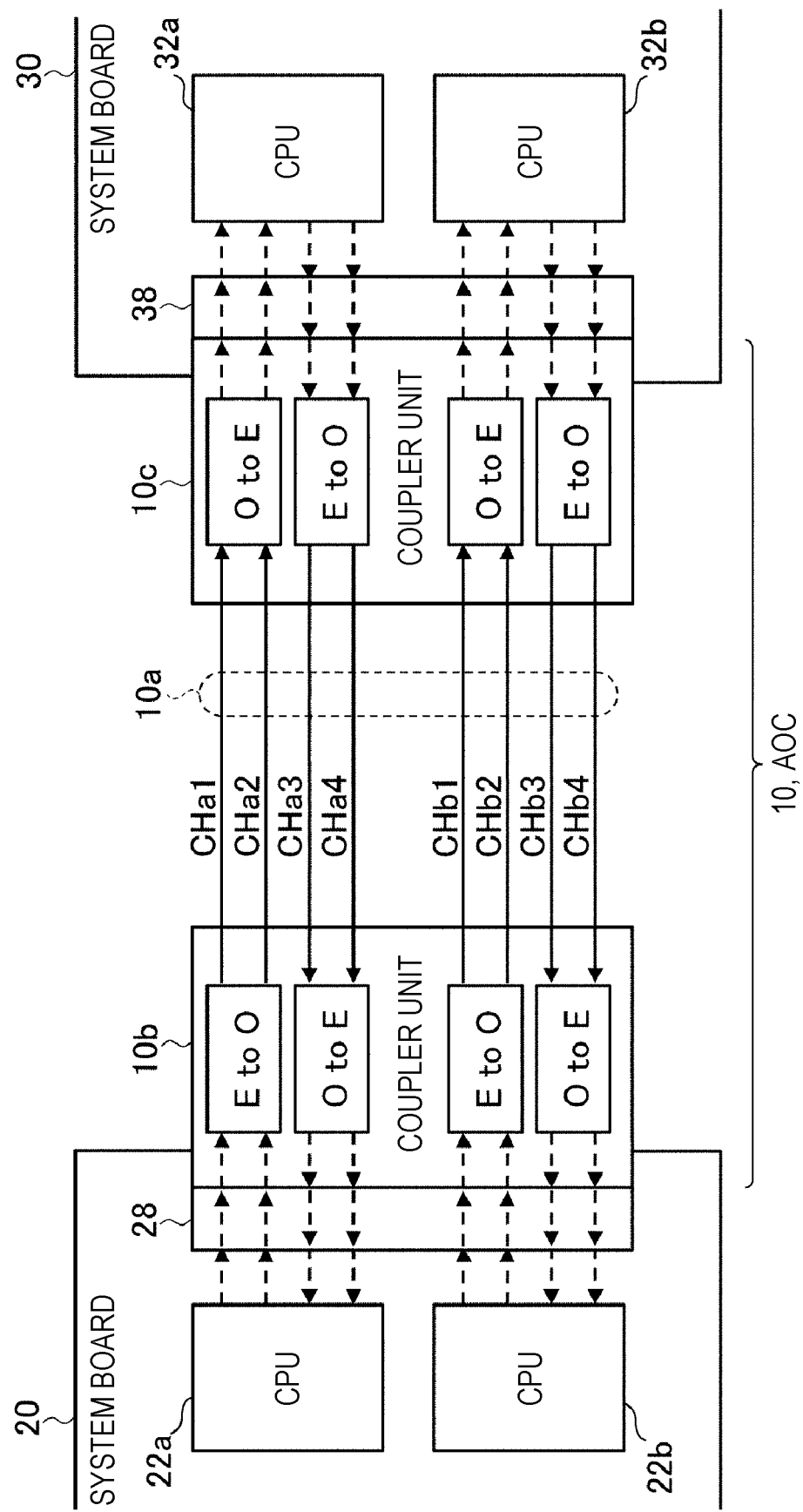
FIG. 2 is a diagram illustrating an example of coupling between CPUs and an optical transmission line in FIG. 1.

FIG. 2 illustrates an example of coupling between the CPUs 22 and 32 and the AOC 10 in FIG. 1. For example, the AOC 10 has an optical cable 10a including eight core wires (optical fibers) and coupler units 10b and 10c attached to both ends of the optical cable 10a. The coupler unit 10b is removably coupled to the coupler 28 attached to the system board 20, and the coupler unit 10c is removably coupled to the coupler 38 attached to the system board 30. In the optical cable 10a, channels CH (CHa1-CHa4, CHb1-CHb4) are allocated to eight core wires. Hereinafter, each of the core wires to which the channels CH are allocated will also be called "channel CH". FIG. 2 illustrates core wires by using solid line arrows and illustrates electrical wires by using broken line arrows.

The channels CHa1 and CHa2 are used for transmission of signals transmitted by the CPU 22a and received by the CPU 32a, and the channels CHa3 and CHa4 are used for transmission of signals transmitted by the CPU 32a and received by the CPU 22a. The channels CHb1 and CHb2 are used for transmission of signals transmitted by the CPU 22b and received by the CPU 32b, and the channels CHb3 and CHb4 are used for transmission of signals transmitted by the CPU 32b and received by the CPU 22b.

Though not particularly limited, for example, in a case where the channels CHa1 and CHa2 are normal, the CPU 22a divides a packet (striping) and transmits the divided packets in parallel by using the channels CHa1 and CHa2. This may increase the packet transmission rate compared with transmission by using one channel CH. The CPU 32a having received the divided packets through the channels CHa1 and CHa2 merges the divided packets into the original packet. On the other hand, in a case where one of the channels CHa1 and CHa2 has a failure, the CPU 22a transmits a packet by using the other one of the channel CHa1 and CHa2.

The other CPUs 22b, 32a, and 32b transmit packets like the CPU 22a, and the other CPUs 22a, 22b, and 32b receive packets like the CPU 32a. Thus, the transmission rate may be improved in a case where a pair of channels CH is normal. In a case where one of the paired channels CH has a failure, the other one of the channels CH may be used to maintain the packet transmission. Each of paired channels CH is also used as a redundant channel CH, as described above.

The number of core wires to be used redundantly may be higher than two. The number of core wires (or the number of channels) of the AOC 10 may be higher than eight. For example, the CPUs 22a and 32a may be coupled by using four core wires (transmission channels) and four core wires (reception channels). In this case, the AOC 10 has 16 core wires that are shared by communication between the CPUs 22a and 32a and communication between the CPUs 22b and 32b.

The coupler unit 10b has an electric-optic conversion unit (E to O) that converts an electric signal from the CPU 22a to an optical signal and outputs the optical signal to core wires of the optical cable 10a to which the channels CHa1 and CHa2 are allocated. The coupler unit 10b has an optic-electric conversion unit (O to E) that converts an optical signal received from the CPU 32a through the core wires of the optical cable 10a to which the channels CHa3 and CHa4 are allocated to an electric signal and outputs the electric signal to the CPU 22a.

The coupler unit 10b has an electric-optic conversion unit (E to O) that converts an electric signal from the CPU 22b to an optical signal and outputs the optical signal to core wires of the optical cable 10a to which the channels CHb1 and CHb2 are allocated. The coupler unit 10b has an optic-electric conversion unit (O to E) that converts an optical signal received from the CPU 32b through the core wires of the optical cable 10a to which the channels CHb3 and CHb4 are allocated to an electric signal and outputs the electric signal to the CPU 22b.

Like the coupler unit 10b, the coupler unit 10c has an optic-electric conversion unit (O to E) corresponding to the channels CHa1 and CHa2 and an electric-optic conversion unit (E to O) corresponding to the channels CHa3 and CHa4. The coupler unit 10c has an optic-electric conversion unit (O to E) corresponding to the channels CHb1 and CHb2 and an electric-optic conversion unit (E to O) corresponding to the channels CHb3 and CHb4.

For example, the coupler units 10b and 10c are adhered to both ends of the optical cable 10a. Therefore, in a case where one of the electric-optic conversion unit and the optic-electric conversion unit in the coupler units 10b and 10c has a failure, the entire AOC 10 including the optical cable 10a and the coupler units 10b and 10c is replaced. An optical transmission line to which the coupler units 10b and 10c and the optical cable 10a are removably coupled may be used for coupling between the system boards 20 and 30. A channel CH is allocated not only to a core wire but also to an electric wire of an electric-optic conversion unit and optic-electric conversion unit coupled to the core wire. Therefore, a failure in the channel CH is caused not only by a fault such as a broken core wire but also by a failure in the electric-optic conversion unit or the optic-electric conversion unit.

Figure 3:
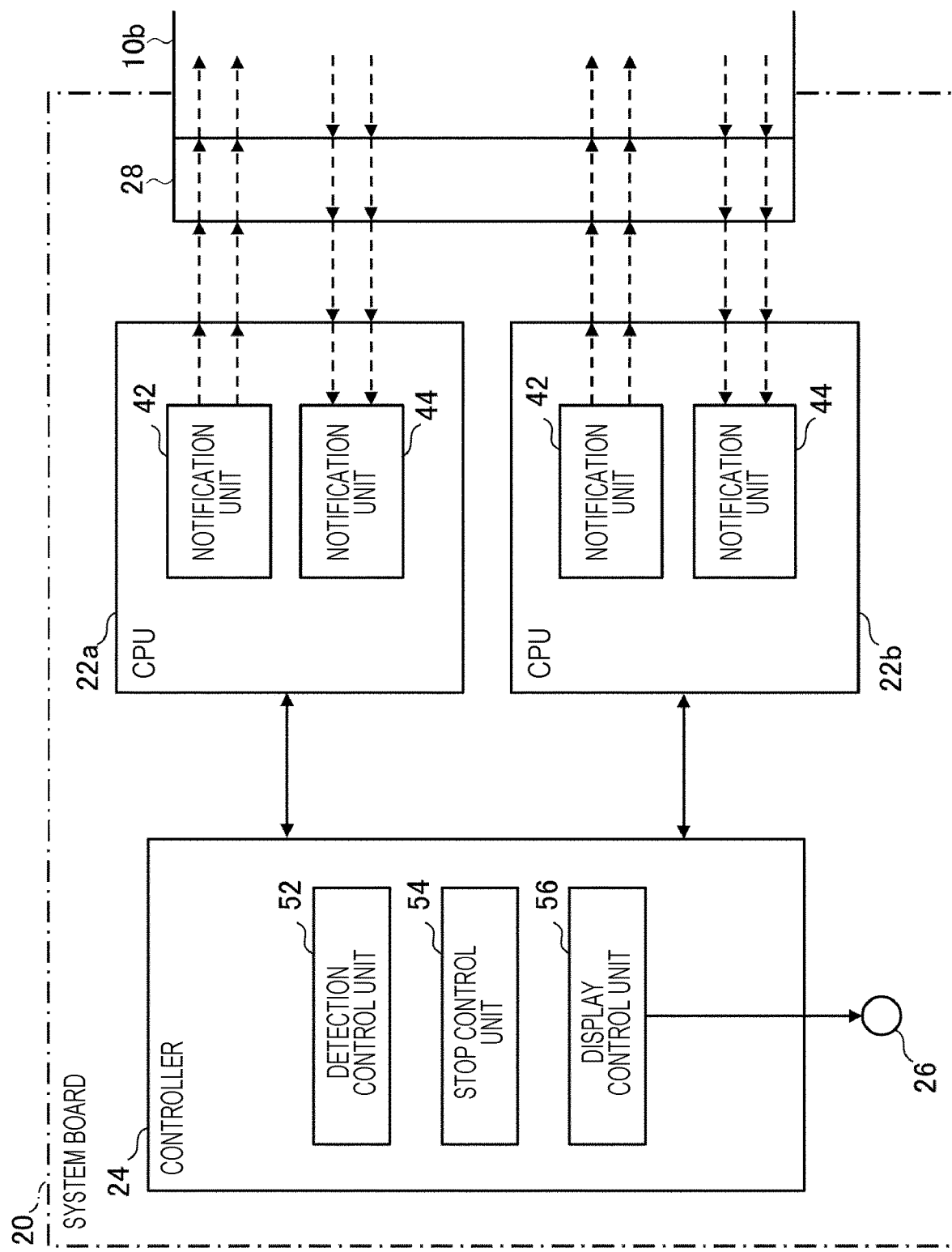
FIG. 3 is a diagram illustrating an example of functional units of the CPUs and a controller that a system board has in FIG. 1.

FIG. 3 illustrates an example of functional units of the CPUs 22a and 22b and the controller 24 that the system board 20 has in FIG. 1. Each of the CPUs 22a and 22b has notification units 42 and 44. The controller 24 has a detection control unit 52, a stop control unit 54, and a display control unit 56.

In a case where the notification unit 42 detects a channel failure that is a failure in one of four channels CH allocated to the CPU 22 having the notification unit 42, the notification unit 42 transmits a packet notifying the channel failure to the communication destination CPU 32 by using a transmitting channel CH not having a failure. The notification unit 42 further notifies the controller 24 about the channel failure detected by the notification unit 42.

If the notification unit 44 receives the packet notifying the channel failure from the other communication partner, the CPU 32, the notification unit 44 notifies the controller 24 of the system board 20 having the notification unit 44 about the channel failure.

The detection control unit 52 monitors the state of the CPU 22 based on the reception of the notification of the channel failure from the CPU 22 and detects whether the CPU 22 is communicating through the AOC 10 including the failing channel CH.

If the CPU 22 communicating through the AOC 10 is detected by the detection control unit 52, the stop control unit 54 outputs a stop instruction to stop the communication using the AOC 10 to the detected CPU 22. For example, the stop instruction is an instruction to stop the detected CPU 22 to execute a job. The CPU 22 having received the stop instruction stops the job in execution to stop the communication using the AOC 10 and notifies the controller 24 that the communication has been stopped. In a case where the CPU 22 having notified about the channel failure stops its job in execution based on the detection of the channel failure, the stop control unit 54 may output the stop instruction to stop execution of a job to the other CPU 22 that has not received the channel failure notification.

Based on the notification that the communication has been stopped from the CPU 22 having received the stop instruction, the display control unit 56 sets the LED 26 corresponding to the AOC 10 including the failing channel CH to a display state indicating that the AOC 10 is replaceable. For example, in a case where the LED 26 is lighted on in green to indicate that the AOC 10 operates normally, the LED 26 is lighted off to indicate that the AOC 10 is replaceable. On the other hand, in a case where the LED 26 is lighted on in red to indicate that the AOC 10 has some abnormality, the LED 26 is lighted on to indicate that the AOC 10 is replaceable.

For example, the functions of the notification units 42 and 44 are implemented by a control program executed by the CPU 22. For example, the functions of the detection control unit 52, the stop control unit 54, and the display control unit 56 are implemented by a control program executed by the processor such as a CPU that the controller 24 has. The functions of the notification units 42 and 44 may be implemented by hardware (logic circuit), and the functions of the detection control unit 52, the stop control unit 54 and the display control unit 56 may be implemented by hardware (logic circuit).

The configuration and functionality of the functional units of the CPU 32 and the controller 34 that the system board 30 has in FIG. 1 are the same as those illustrated in FIG. 3. The functional units of the CPU 32 and the controller 34 are described by replacing the CPU 22 by the CPU 32, the CPU 32 by the CPU 22, the controller 24 by the controller 34, the LED 26 by the LED 36 and the system board 20 by the system board 30.

Figure 4:
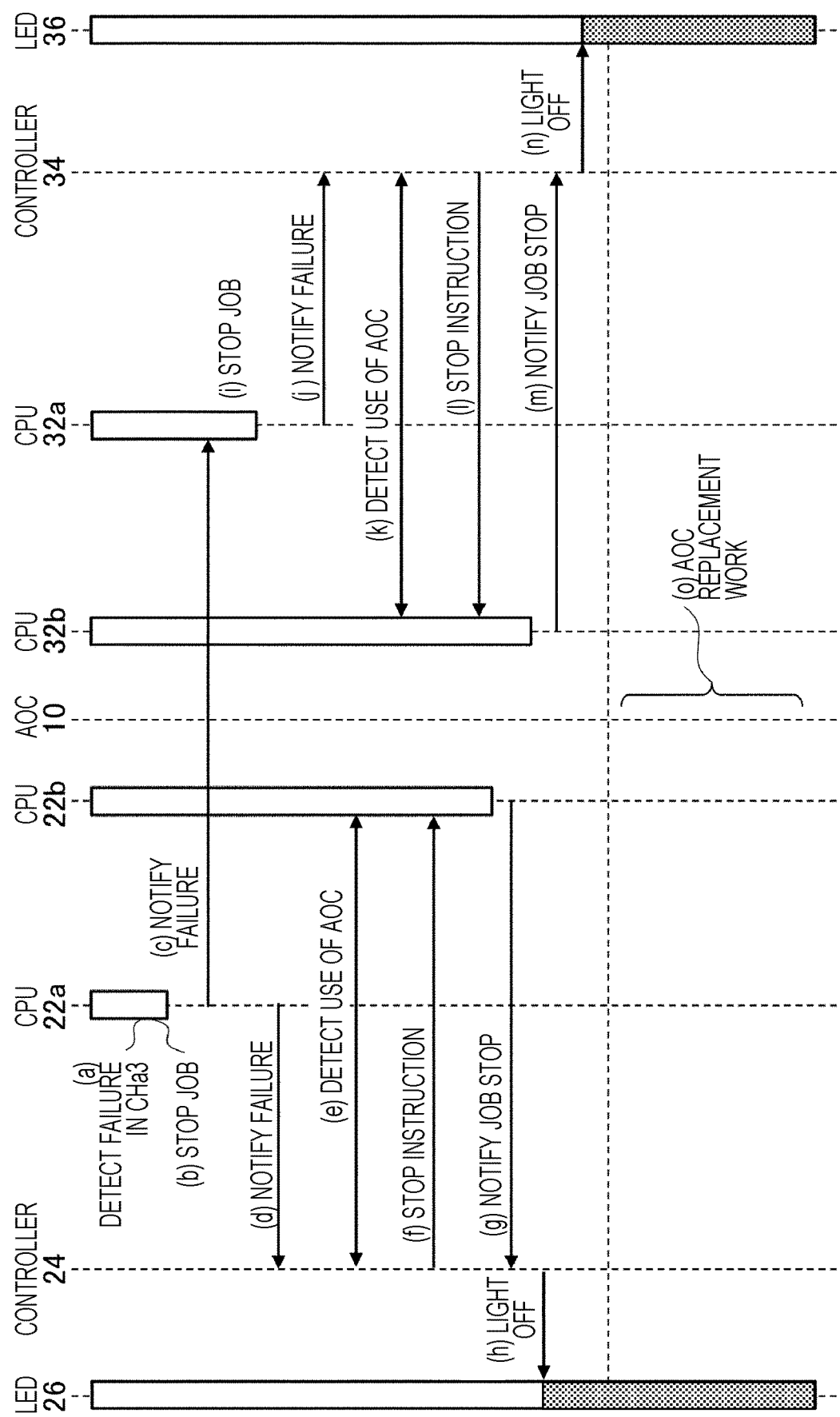
FIG. 4 is a diagram illustrating an example of operations of the parallel processing apparatus in FIG. 1.

FIG. 4 illustrates an example of operations of the parallel processing apparatus 100 in FIG. 1. White rectangles associated with the CPUs 22a, 22b, 32a, and 32b indicate that a job using the AOC 10 is being executed. White rectangles associated with the LEDs 26 and 36 indicate a light-on state, and black rectangles associated therewith indicate a light-off state. The LEDs 26 and 36 emit green light in their light-on states, for example.

For example, the CPU 22a detects a failure in the channel CHa3 while the CPU 22a is executing a job together with the CPU 32a in parallel by using the channels CHa1, CHa2, CHa3, and CHa4 (FIG. 4, (a)). The CPU 22a stops the job and notifies the CPU 32a about the channel failure by using at least one of the channels CHa1 and CHa2 that normally operates (FIG. 4, (b) and (c)). The CPU 22a further notifies the controller 24 about the channel failure (FIG. 4, (d)).

The controller 24 detects whether there is a CPU 22 that is communicating through the AOC 10 based on the failure notification (FIG. 4, (e)). If the controller 24 detects that the CPU 22b is communicating through the AOC 10, the controller 24 outputs a stop instruction to stop execution of the job to the CPU 22b (FIG. 4, (f)). Based on the reception of the stop notification indicating that the job has been stopped from the CPU 22b, the controller 24 lights off the LED 26 (FIG. 4, (g) and (h)).

If the controller 24 detects that the CPU 22b is not executing communication using the AOC 10, the controller 24 lights off the LED 26. The light-off state of the LED 26 indicates that all CPUs 22 over the system board 20 are not executing communication using the AOC 10.

For example, in a case where the system board 20 has three or more CPUs 22 sharing the AOC 10, the controller 24 detects whether all of the CPUs 22 other than the CPU 22a from which the channel failure is detected are communicating through the AOC 10 or not. Based on the state that all of the CPUs 22 communicating through the AOC 10 stop jobs, the controller 24 lights off the LED 26.

On the other hand, the CPU 32a having received the notification about the channel failure from the CPU 22a stops the job and notifies the controller 34 about the channel failure (FIG. 4, (i) and (j)). The controller 34 detects whether there is a CPU 32 that is communicating through the AOC 10 based on the failure notification (FIG. 4, (k)). If the controller 34 detects that the CPU 32b is communicating through the AOC 10, the controller 34 outputs a stop instruction to stop execution of the job to the CPU 32b (FIG. 4, (l)). Based on the reception of the stop notification indicating that the job has been stopped from the CPU 32b, the controller 34 lights off the LED 36 (FIG. 4, (m) and (n)).

If the controller 34 detects that the CPU 32b is not executing communication using the AOC 10, the controller 34 lights off the LED 36. The light-off state of the LED 36 indicates that all CPUs 32 over the system board 30 are not executing communication using the AOC 10. The light-off states of the LEDs 26 and 36 based on the fact that the jobs have been stopped are an example of the stop indication state indicating the communication through the failing AOC 10 has been stopped.

Figure 9:
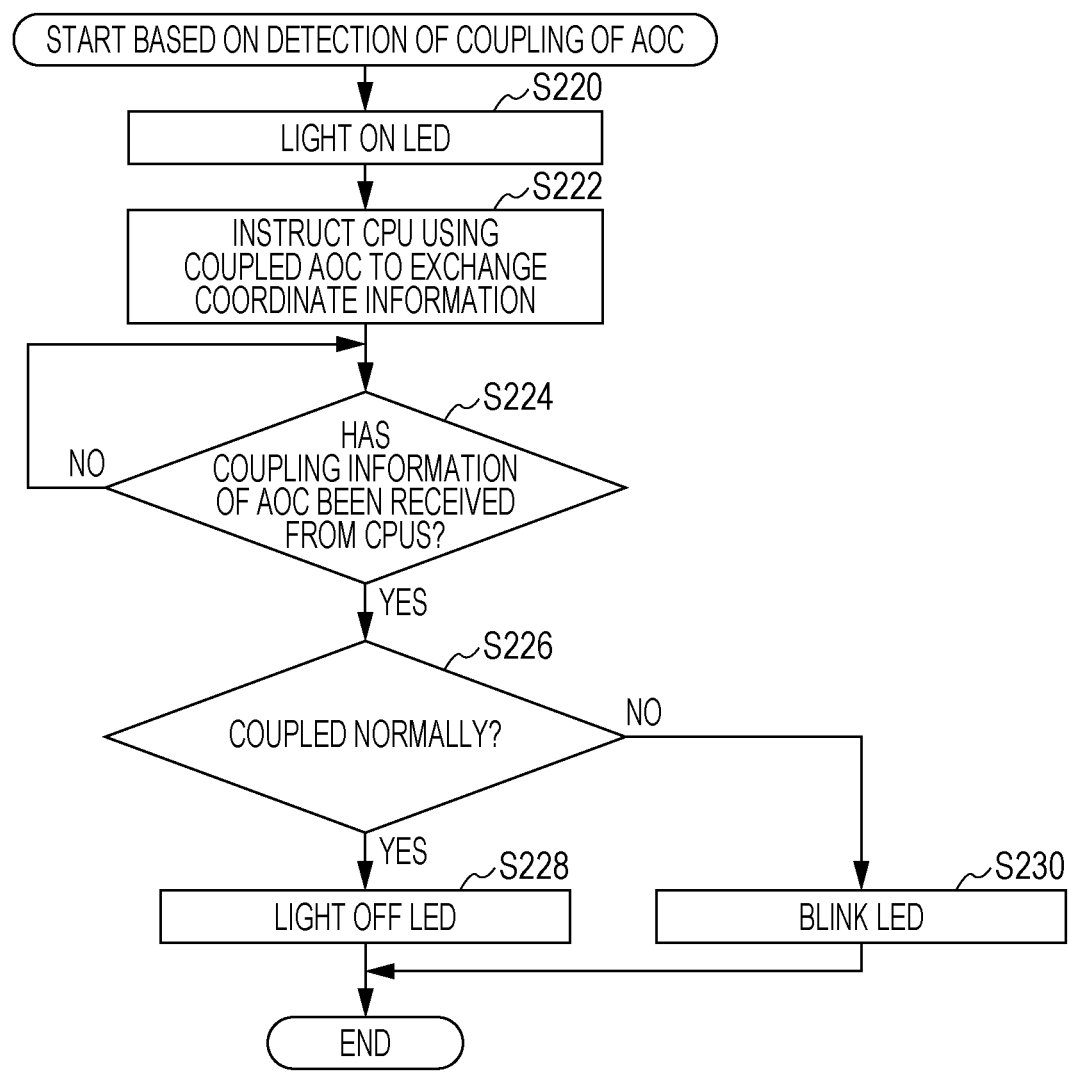
FIG. 9 is a diagram illustrating an example of other operations by the controller in FIG. 1.
Figure 10:
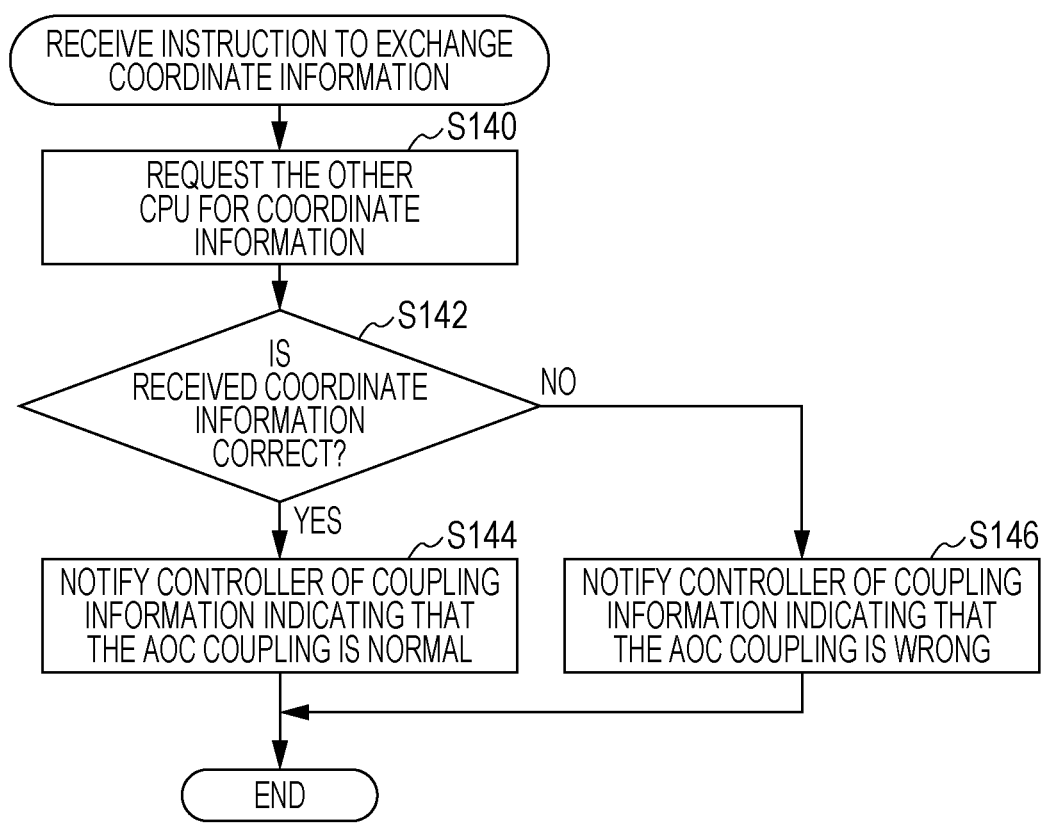
FIG. 10 is a diagram illustrating an example of other operations by the CPUs in FIG. 1.

For example, when both of the LEDs 26 and 36 over the system boards 20 and 30 coupled by the AOC 10 are lighted off, the maintenance staff who performs maintenance for the parallel processing apparatus 100 judges that the AOC 10 is replaceable because communication using the AOC 10 is not being executed. The maintenance staff then executes a replacement work for replacing the AOC 10 including the failing channel CH by a new AOC 10 (FIG. 4, (o)). FIGS. 9 and 10 illustrate operations of the controllers 24 and 34 and the CPUs 22 and 32 after the replacement of the AOC 10. Hereinafter, the AOC 10 including a failing channel CH will also be called a "failing AOC 10" though it also includes a normal channel CH.

If the controller 24 receives the notification about the channel failure from the CPU 22, the controller 24 notifies the management device 50 about the channel failure. If the controller 34 receives the notification about the channel failure from the CPU 32, the controller 34 notifies the management device 50 about the channel failure. Based on the reception of the notification about the channel failure, the management device 50 displays information indicating the system board 20 (or 30) having the channel failure and the AOC 10 having the channel failure, for example, on a screen of a display provided in the management device 50. In other words, for example, information indicating an abnormality has occurred in communication using the AOC 10 is displayed on the screen of the display.

For example, a system manager who manages operations of the parallel processing apparatus 100 contacts and informs the maintenance staff of the failure of the AOC 10 based on the information displayed on the screen of the display in the management device 50. The maintenance staff may recognize the failure of the AOC 10 based on the contact from the manager or may recognize the failure of the AOC 10 through other measures. For example, in a case where the maintenance staff is close to the parallel processing apparatus 100, the maintenance staff may recognize the failure of the AOC 10 based on the fact that both of the LEDs 26 and 36 are lighted off.

As illustrated in FIG. 4, the parallel processing apparatus 100 lights off the LEDs 26 and 36 based on the stop of the communication using the AOC 10 in the system boards 20 and 30 so that the AOC 10 is replaceable based on the light-off states of both of the LEDs 26 and 36. This may suppress a system failure that causes abnormal stop of a job in execution due to removal of the AOC 10 (being used for communication) corresponding to the lighting LEDs 26 and 36.

In a case where a plurality of AOCs 10 are coupled to the system boards 20 and 30, it is judged that a failing AOC 10 is replaceable based on the light-off states of the pair of the LEDs 26 and 36 corresponding to the failing AOC 10. This may suppress improper removal of the other AOC 10 that is not failed and corresponds to the LEDs having light-on states from the couplers 28 and 38, which may improve the efficiency of the AOC 10 replacement work. For example, also when a plurality of system boards 20 to which a plurality of AOCs 10 are coupled is stored in a rack and many AOCs 10 are accommodated in the rack, improper removal of the AOC 10 that is not failed may be suppressed.

Figure 5:
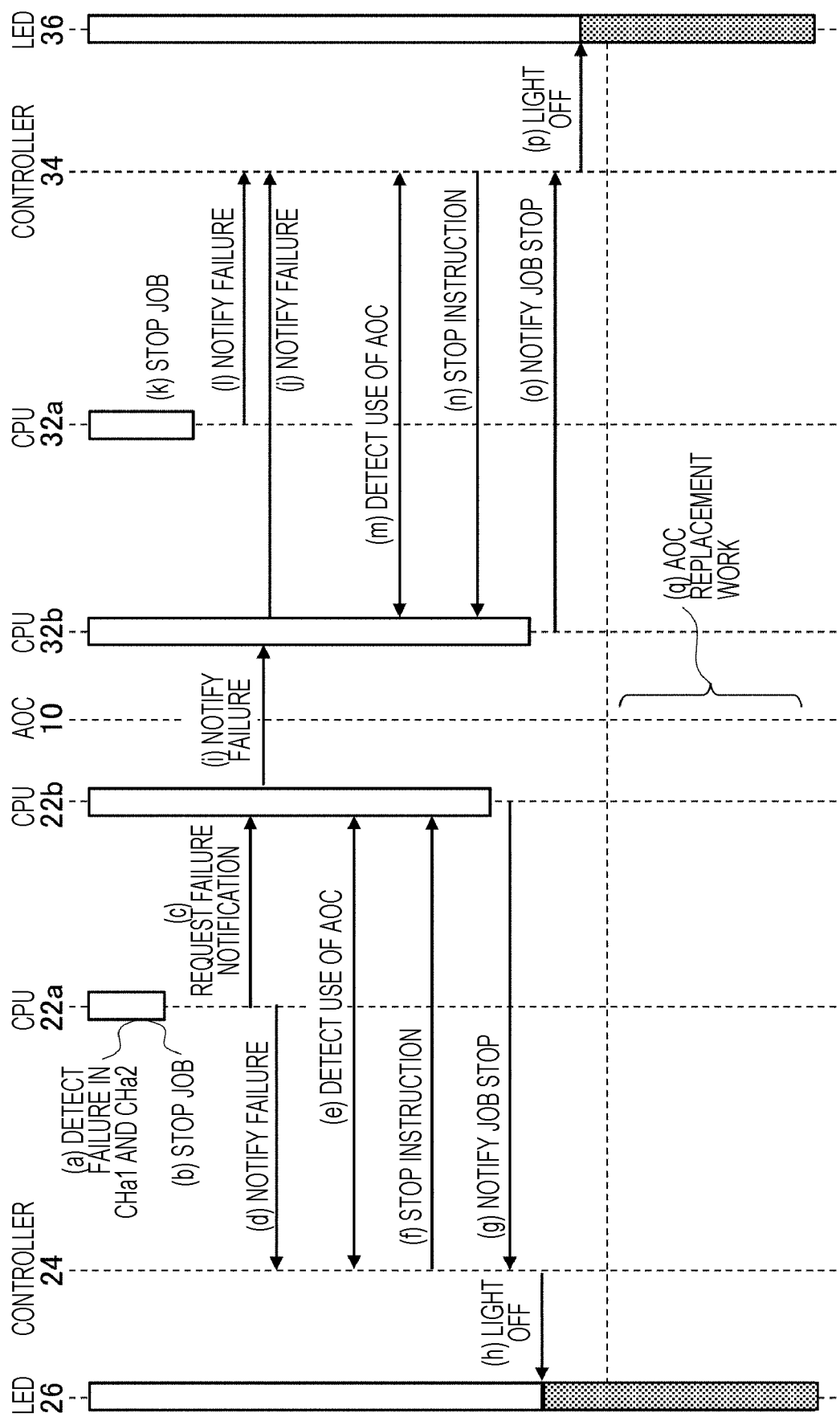
FIG. 5 is a diagram illustrating another example of operations of the parallel processing apparatus in FIG. 1.

FIG. 5 illustrates another example of operations of the parallel processing apparatus 100 in FIG. 1. Detailed description of operations that are similar to those illustrated in FIG. 5 is omitted. Referring to FIG. 5, the CPU 22a detects channel failures of both of a pair of transmitting channels CHa1 and CHa2 (FIG. 5, (a)). Therefore, the CPU 22a may not notify the CPU 32a about the channel failures.

The CPU 22a stops its job and issues a request for notifying the system board 30 about the channel failures to the CPU 22b within the system board 20 having the CPU 22a (FIG. 5, (b) and (c)). The request for the notification may be issued from the CPU 22a to the CPU 22b through a communication path, not illustrated in FIG. 3, or through the controller 24.

The CPU 22a notifies the controller 24 about the channel failures (FIG. 5, (d)). The operation for notifying the controller 24 about the channel failures by the CPU 22a and for detecting communication by other CPUs 22 using the AOC 10 by the controller 24 are the same as those illustrated in FIG. 4 (FIG. 5, (e) and (f)). Based on the reception of the stop notification indicating that the job has been stopped from the CPU 22b, the controller 24 lights off the LED 26 (FIG. 5, (g) and (h)).

The CPU 22b having received the notification request notifies the CPU 32b about the channel failures by using at least one of the paired transmitting channels CHb1 and CHb2 (FIG. 5, (i)). The CPU 32b having received the notification about the channel failures from the CPU 22b notifies the controller 34 about the channel failures (FIG. 5, (j)). Based on the reception of the request for notification of the channel failures from the CPU 22a, the CPU 22b may stop a job in execution before instructed to stop the job by the controller 24.

Based on reception of no packet from the CPU 22a, the CPU 32a detects the channel failures of the channels CHa1 and CHa2, stops its job and notifies the controller 34 about the channel failures (FIG. 5, (k) and (l)).

Like the operation in FIG. 4, the controller 34 detects whether there is a CPU that is communicating through the AOC 10 based on the failure notification (FIG. 5, (m)). The controller 34 detects whether there is a CPU that is communicating through the AOC 10 based on an earlier one of the channel failure notifications from the CPUs 32a and 32b.

If the controller 34 detects that the CPU 32b is communicating through the AOC 10, the controller 34 outputs a stop instruction to stop execution of the job to the CPU 32b (FIG. 5, (n)). Based on the reception of the stop notification indicating that the job has been stopped from the CPU 22b, the controller 24 lights off the LED 26 (FIG. 5, (o) and (p)). Then, when both of the LEDs 26 and 36 over the system boards 20 and 30 coupled by the AOC 10 are lighted off, the maintenance staff who performs maintenance for the parallel processing apparatus 100 executes the AOC 10 replacement work (FIG. 5, (q)).

In a case where the CPU 32b stops its job based on the channel failure notification, the controller 34 does not detect the CPU 32 that is communicating by using the AOC 10. In this case, the controller 24 does not issue an instruction for the job stop and lights off the LED 36. Like the operation in FIG. 4, if the controller 24 receives the notification about the channel failure from the CPU 22, the controller 24 notifies the management device 50 about the channel failure. If the controller 34 receives the notification about the channel failure from the CPU 32, the controller 34 notifies the management device 50 about the channel failure. The management device 50 having received the channel failure notification operates in the same manner as that in FIG. 4.

As illustrated in FIG. 5, in a case where both of the paired transmitting channels CHa1 and CHa2 of the CPU 22a are failed, the CPU 22a requests the CPU 22b to notify the system board 30 about the channel failures. The CPU 22b having received the request notifies the communication partner, CPU 32b, about the channel failures. Thus, in a case where both of paired transmitting channels CH are not usable, the channel failures may be notified to the communication destination, system board 30, and the operation for lighting off the LEDs 26 and 36, which is a sign for starting the AOC 10 replacement work, may be normally executed.

Figure 6:
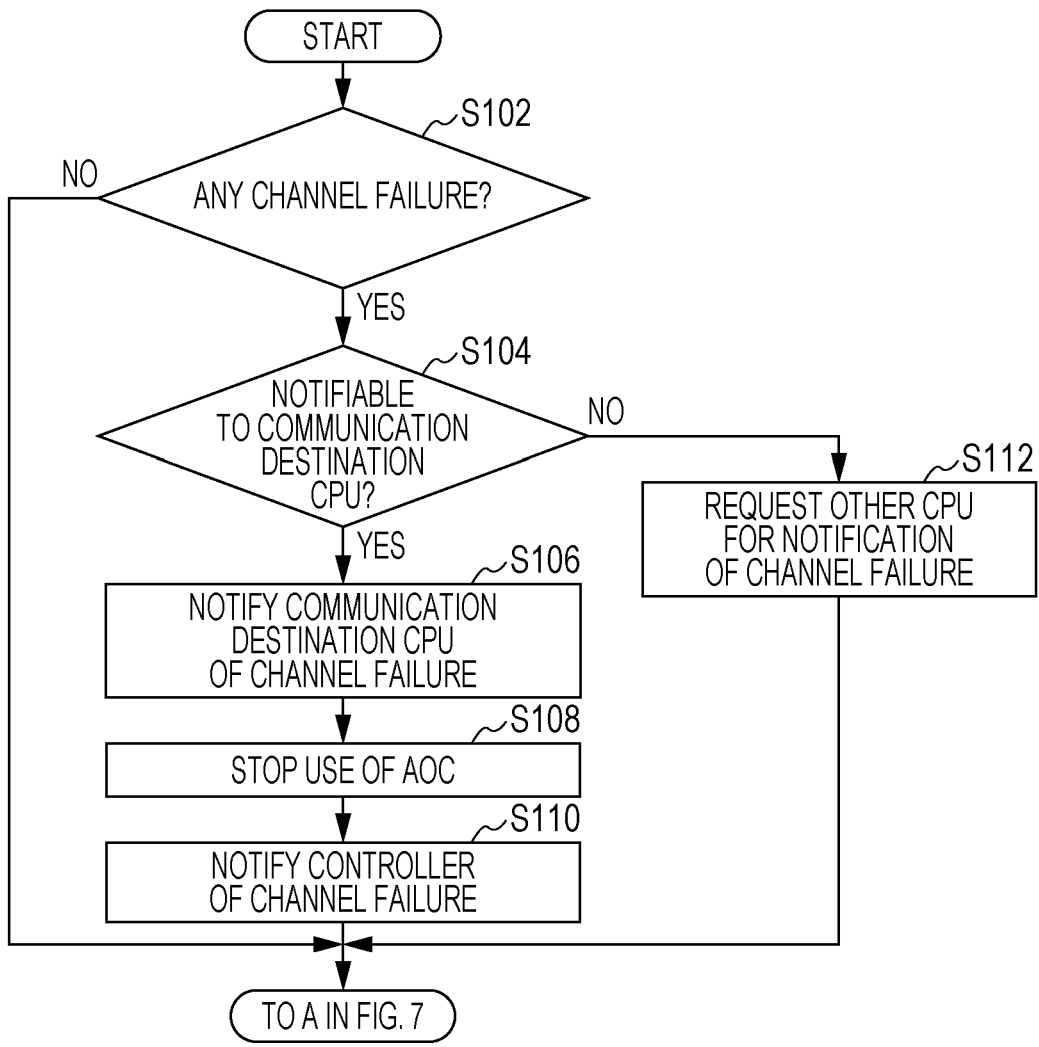
FIG. 6 is a diagram illustrating an example of operations of the CPUs in FIG. 1.
Figure 7:
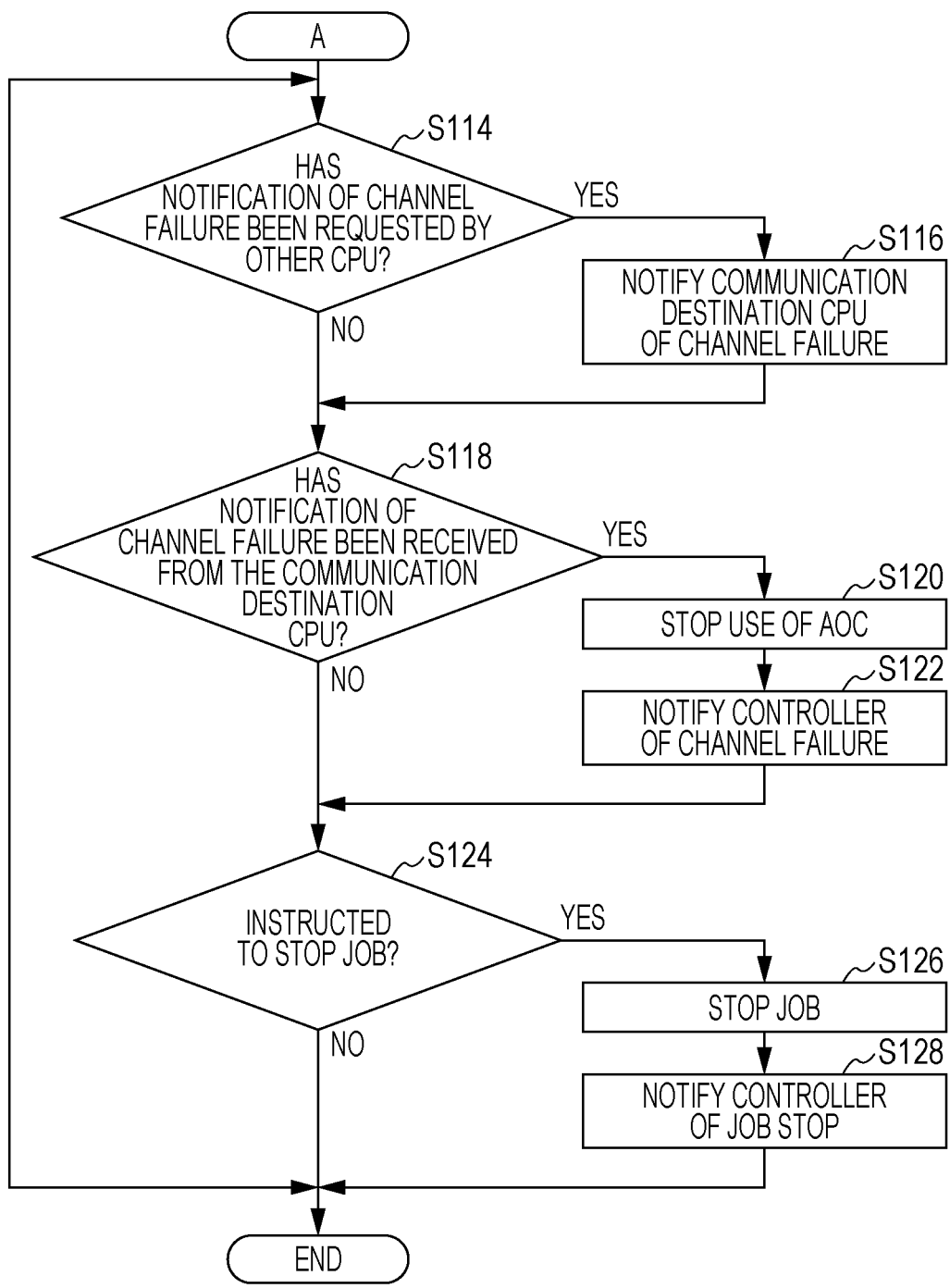
FIG. 7 is a diagram illustrating a continuation of the operations in FIG. 6.

FIGS. 6 and 7 illustrate examples of operations by the CPUs 22 and 32 in FIG. 1. In other words, for example, FIGS. 6 and 7 illustrate examples of a method for controlling CPUs 22 and 32. The operations illustrated in FIGS. 6 and 7 may be implemented by a control program executed by the CPUs 22 and 32. The operating flows illustrated in FIGS. 6 and 7 are started at predetermined cycles, for example. Because the operations to be performed by the CPUs 22 and 32 are the same as each other, the operations to be performed by the CPU 22 will be described below.

A channel failure is caused not only by failure in a core wire in the optical cable 10a illustrated in FIG. 2 but also by a failure in the electric-optic conversion unit and the optic-electric conversion unit. The CPUs 22 and 32 execute their jobs by executing a processing program (such as a user program or an application program) executing information processing separately from the operations illustrated in FIGS. 6 and 7.

First, in step S102, the CPU 22 decides whether a channel failure has occurred based on the presence of a response to a transmission packet or the bit error rate, for example. If a channel failure has occurred, the processing moves to step S104. If no channel failure has occurred, the processing moves to A (step S114) in FIG. 7.

In step S104, if the CPU 22 may notify the CPU 32 that is the communication destination about the occurrence of the channel failure, the processing moves to step S106. If the CPU 22 may not notify the CPU 32 that is the communication destination about the occurrence of the channel failure, the processing moves to step S112. For example, if the CPU 22a decides failures of both of the transmitting channels CHa1 and CHa2, the CPU 22a decides that the occurrence of the channel failures may not be notified to the CPU 32 that is the communication destination.

In step S106, the CPU 22 uses a normal channel CH not having a channel failure to notify the CPU 32 that is the communication destination about the occurrence of the channel failures. Next, in step S108, the CPU 22 stops the job in execution to stop the communication using the AOC 10. Next, in step S110, the CPU 22 notifies the controller 24 about the occurrence of the channel failure. The processing then moves to A (step S114) in FIG. 7.

In step S112, the CPU 22 requests another CPU 22 within the system board 20 to notify the system board 30 about the channel failures. The processing then moves to A (step S114) in FIG. 7.

If the CPU 22 is requested to notify the system board 30 about the channel failures by the other CPU 22 in the system board 20 in step S114 in FIG. 7, the processing moves to step S116. If the CPU 22 is not requested to notify the system board 30 about the channel failures by the other CPU 22 in the system board 20, the processing moves to step S118. In step S116, the CPU 22 uses a normal channel CH not having a channel failure to notify the CPU 32 that is the communication destination about the occurrence of the channel failures. The processing moves to step S118.

In step S118, if the CPU 22 receives the notification about the channel failures from the CPU 32 that is the communication destination, the processing moves to step S120. If the CPU 22 does not receive the notification about the channel failure from the CPU 32 that is the communication destination, the processing moves to step S124. In step S120, the CPU 22 stops the job in execution to stop the communication using the AOC 10. Next, in step S122, the CPU 22 notifies the controller 24 about the occurrence of the channel failure. The processing then moves to step S124.

If the CPU 22 receives an instruction to stop a job from the controller 24 in step S124, the processing moves to step S126. If the CPU 22 does not receive an instruction to stop a job from the controller 24, the processing ends. In step S126, the CPU 22 stops the job in execution to stop the communication using the AOC 10. Next, in step S128, the CPU 22 notifies the controller 24 about the stop of the job. The processing then returns to step S102.

Figure 8:
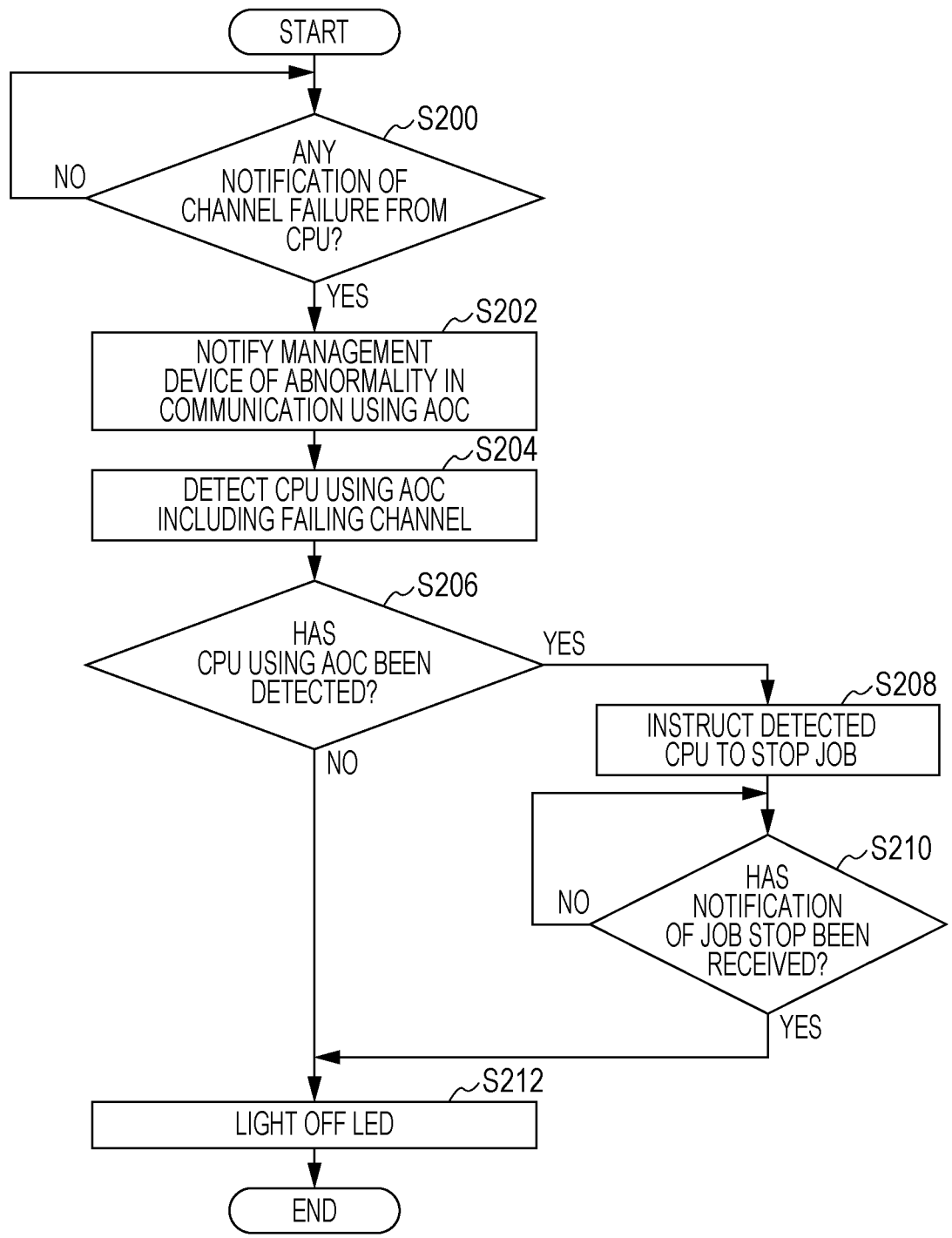
FIG. 8 is a diagram illustrating an example of operations by the controller in FIG. 1.

FIG. 8 illustrates an example of operations to be performed by the controllers 24 and 34 in FIG. 1. In other words, for example, FIG. 8 illustrates an example of a method for controlling the controllers 24 and 34. The operations illustrated in FIG. 8 may be implemented by a control program executed by the CPU in each of the controllers 24 and 34. The operating flow illustrated in FIG. 8 is started, for example, every time when communication is established between the system boards 20 and 30 (or for each starting operation that links up channels CH). Because the operations to be performed by the controllers 24 and 34 are the same as each other, the operations to be performed by the controller 24 will be described below. The controller 24 executes a control program that monitors states of the CPUs 22 and monitors a coupling state of the AOC 10, separately from the operations illustrated in FIG. 8.

First, in step S200, the controller 24 waits for a notification about a channel failure from one of the CPUs 22 and moves the processing to step S202 based on reception of a notification of a channel failure. In step S202, the controller 24 notifies the management device 50 that an abnormality has occurred in a communication using the AOC 10 based on reception of the notification of the channel failure.

Next, in step S204, the controller 24 detects the CPU 22 communicating through the AOC 10 including the failing channel CH. For example, the controller 24 detects the CPU 22 communicating through the AOC 10 based on job execution information notified from the CPUs 22. The controller 24 holds information indicating which CPU 22 is coupled with which CPU 32 by using which channel CH.

Next, if the controller 24 detects the CPU 22 communicating through the AOC 10 including the failing channel CH in step S206, the processing moves to step S208. If the controller 24 does not detect the CPU 22 communicating through the AOC 10 including the failing channel CH, the processing moves to step S212.

The controller 24 instructs the detected CPU 22 to stop its job in step S208, and the processing moves to step S210. In step S210, the controller 24 waits for reception of notification of job stop from the CPU 22 instructed to stop its job, and if the controller 24 receives the notification of the job stop, the processing moves to step S212. In step S212, the controller 24 lights off the LED 26 and ends its operation.

FIG. 9 illustrates an example of other operations to be performed by the controllers 24 and 34 in FIG. 1. In other words, for example, FIG. 9 illustrates an example of a method for controlling the controllers 24 and 34. The operations illustrated in FIG. 9 may be implemented by a control program executed by the CPU in each of the controllers 24 and 34.

The operating flow illustrated in FIG. 9 is started based on detection of coupling of the AOC 10 to the system boards 20 and 30, for example. The coupling of the AOC 10 is detected when the controller 24 receives a signal over the system board 20 that changes its logical level if a terminal for coupling detection provided in the AOC 10 is coupled with the coupler 28 (FIG. 2). For example, the coupling of the AOC 10 is detected when the failing AOC 10 is replaced or when the AOC 10 is re-coupled. Because the operations to be performed by the controllers 24 and 34 are the same as each other, the operations to be performed by the controller 24 will be described below.

In step S220, the controller 24 lights on the LED 26. Next, in step S222, the controller 24 instructs the CPU 22 communicating through the AOC 10 the coupling of which has been detected to exchange coordinate information. For example, the controller 24 requests the CPU 22 to obtain coordinate information for the other CPU 32 coupled through the AOC 10.

Here, the coordinate information is information indicating positions (or coordinates) of the CPUs 22 and 32 over a computer network including a plurality of CPUs 22 and 32. For example, the coordinate information of the CPUs 22 and 32 (nodes) included in a three-dimensional mesh/torus network includes coordinates (X, Y, Z) of an X axis, a Y axis and a Z axis. Each of the CPUs 22 and 32 holds in advance coordinate information indicating its own coordinates and coordinate information indicating the coordinates of the other CPUs 32 and 22 directly connected over a network. In a three-dimensional mesh/torus network, the other CPUs 32 and 22 holding coordinate information are positioned at X+, X−, Y+, Y−, Z+, Z− with respect to one CPU. The coordinate information exchanging operation by the CPUs 22 and 32 will be described with reference to FIG. 10.

Next, in step S224, the controller 24 waits for reception of the coupling information of the AOC 10 notified from the CPU 22 that has exchanged coordinate information with the CPU 32. Based on the reception of the coupling information, the processing moves to step S226. In step S226, if the received coupling information indicates that the CPU 22 is coupled with the proper CPU 32 through the AOC 10, the controller 24 moves the processing to step S228. On the other hand, if the received coupling information indicates that the CPU 22 is coupled with an improper CPU 32 through the AOC 10, the controller 24 moves the processing to step S230. In other words, for example, if the coupling through the AOC 10 is improper, the processing moves to step S230.

In step S228, the controller 24 lights off the LED 26 and ends its operation. In step S230, the controller 24 blinks the LED 26 and ends its operation. When the AOC 10 is properly coupled, link up is then executed between the CPUs 22 and 32 so that the channels CH may have a communicable state. With completion of the link up, the LED 26 is lighted on again. On the other hand, when the AOC 10 is improperly coupled, the maintenance staff recognizes the improper coupling based on the blinking LED 26 and couples the AOC 10 again for correct coupling of the AOC 10 in a correct path. When the AOC 10 is coupled again, the controller 24 executes the operations illustrated in FIG. 9 again.

FIG. 10 illustrates an example of operations by the CPUs 22 and 32 in FIG. 1. In other words, for example, FIG. 10 illustrates an example of a method for controlling the CPUs 22 and 32. The operations illustrated in FIG. 10 may be implemented by a control program executed by the CPUs 22 and 32. Because the operations to be performed by the CPUs 22 and 32 are the same as each other, the operations to be performed by the CPU 22 will be described below. The operating flow illustrated in FIG. 10 is started based on reception by the CPU 22 of an instruction to exchange coordinate information from the controller 24 (step S222 in FIG. 9).

First, in step S140, the CPU 22 requests coordinate information to the CPU 32 with which the CPU 22 is communicating and that is coupled through the AOC 10. For example, when the AOC 10 is to be replaced, one coupler unit 10b of the AOC 10 is coupled with the CPUs 22a and 22b through the coupler 28, and the other coupler unit 10c of the AOC 10 is coupled with the CPUs 32a and 32b through the coupler 38. Therefore, when the AOC 10 is to be replaced, the CPUs 22a and 22b request coordinate information from the CPUs 32a and 32b, and the CPUs 32a and 32b request coordinate information from the CPUs 22a and 22b, respectively. Then, the coordinate information exchange is executed between the CPUs 22a and 32a and between the CPUs 22b and 32b. Note that, when the CPU 22 requests coordinate information from the other CPU 32, the CPU 22 notifies the CPU 32 of the coordinate information of the CPU 22.

Next, in step S142, if the coordinate information received from the CPU 32 is correct, the CPU 22 moves the processing to step S144. If the coordinate information received from the CPU 32 is wrong, the CPU 22 moves the processing to step S146.

For example, in a three-dimensional mesh/torus network, if one of an X axis, a Y axis and a Z axis in the coordinate information received from the CPU 32 is different from the coordinates (X, Y, Z) of the coordinates of the CPU 22 by "1", the CPU 22 decides that the coordinate information is correct. For example, when the CPU 22 is at coordinates (2, 2, 2) and when the received coordinate information is (2, 1, 2), (1, 2, 2) or (2, 2, 3), the CPU 22 decides the coupling of the AOC 10 is correct.

On the other hand, when coordinate information received from the CPU 32 is different from the coordinates (X, Y, Z) of the CPU 22 and if a total sum of the difference in X-axis Y-axis and Z-axis coordinates is "2" or higher, the CPU 22 decides that the coupling of the AOC 10 is wrong. For example, when the CPU 22 is at coordinates (2, 2, 2) and if the received coordinate information is (2, 0, 2), (1, 1, 2) or (1, 2, 3), the CPU 22 decides that the coupling of the AOC 10 is wrong.

In step S144, the CPU 22 notifies the controller 24 of coupling information indicating that the coupling of the AOC 10 is normal, and the CPU 22 ends its operations. In step S146, the CPU 22 notifies the controller 24 of coupling information indicating that the coupling of the AOC 10 is wrong, and the CPU 22 ends its operations.

Figure 11:
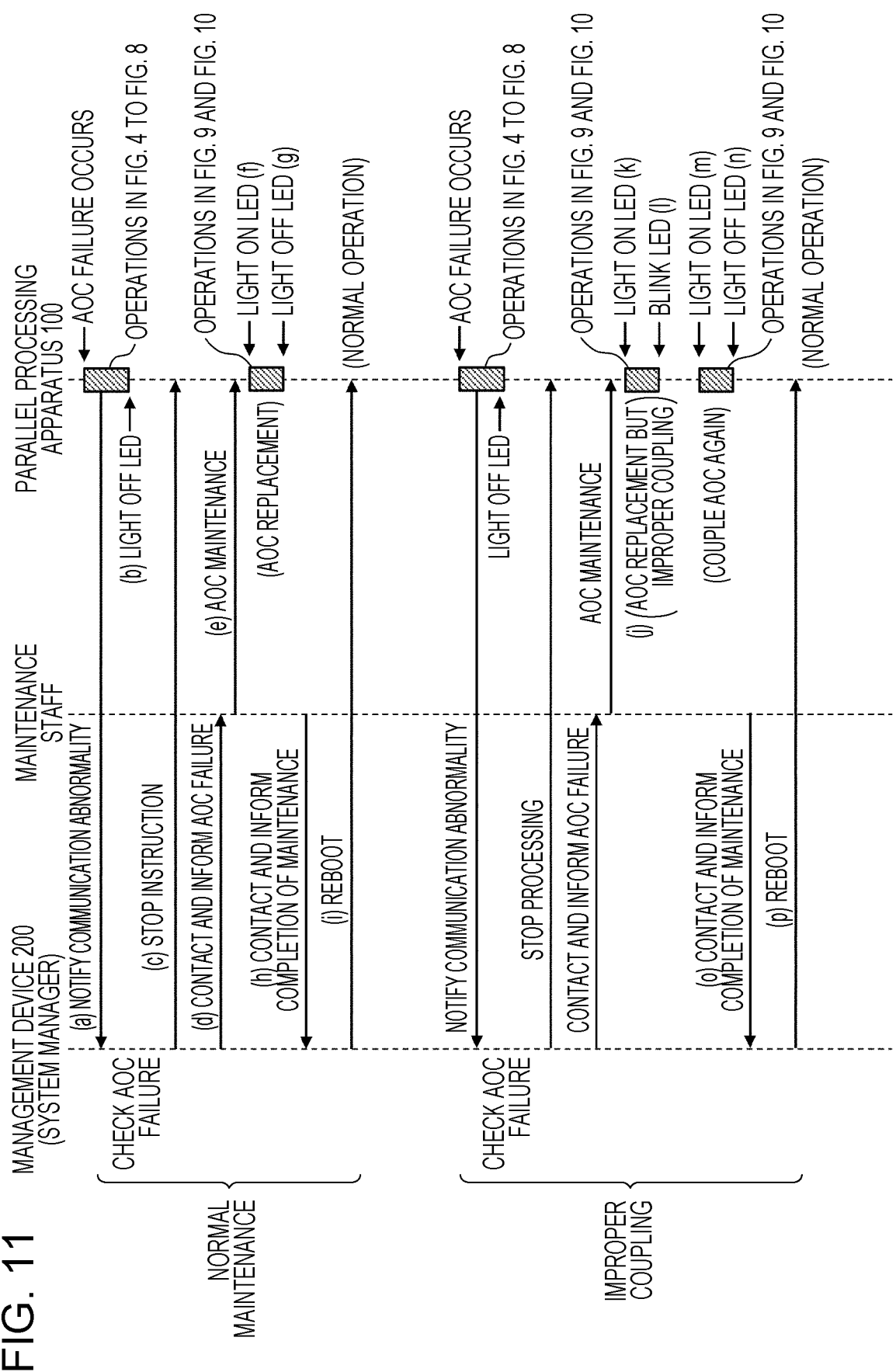
FIG. 11 is a diagram illustrating an example of operations of the parallel processing apparatus in FIG. 1.

FIG. 11 illustrates an example of a maintenance work to be performed on the parallel processing apparatus 100 in FIG. 1. The upper maintenance sequence in FIG. 11 corresponds to a case where a failing AOC 10 is to be replaced by a new AOC 10 normally by a maintenance work after a failure occurs in the AOC 10. The lower maintenance sequence in FIG. 11 corresponds to a case where one of the coupler units 10b and 10c of the new AOC 10 is coupled to a system board different from the system board to which the failing AOC 10 has been coupled in the maintenance work after a failure has occurred in the AOC 10.

In the upper maintenance sequence in FIG. 11, a channel failure in the AOC 10 is detected by one of the CPUs 22 and 32, and the parallel processing apparatus 100 executes the operations illustrated in FIGS. 4 to 8. At least one of the controllers 24 and 34 notifies the management device 50 that an abnormality has occurred in a communication using the AOC 10 (FIG. 11, (a)). The management device 50 displays the occurrence of the communication abnormality (alarm) on the display. The controllers 24 and 34 in the parallel processing apparatus 100 light off the LEDs 26 and 36 such that the maintenance staff may recognize that the AOC 10 is replaceable because of the stop of the communication using the AOC 10 (FIG. 11, (b)). The light-off states of the LEDs 26 and 36 after occurrence of the channel failure corresponds to a stop indication state indicating the communication through the failing AOC 10 has been stopped.

The system manager who manages operations of the parallel processing apparatus 100 decides whether the AOC 10 has been failed or not based on the alarm displayed on the display screen of the management device 50. When the system manager decides a failure in the AOC 10, the system manager operates the terminal of the management device 50 to issue a stop instruction to stop operations of the system boards 20 and 30 coupled to the failing AOC 10 to the controllers 24 and 34 of the system boards 20 and 30 (FIG. 11, (c)). The controllers 24 and 34 having received the stop instruction change the system boards 20 and 30 from a normal operating mode to a maintenance mode, for example.

The system manager further contacts and informs the maintenance staff who performs a maintenance work on the parallel processing apparatus 100 that the AOC 10 has been failed (FIG. 11, (d)). The maintenance staff executes the maintenance work on the AOC 10 (that is, AOC 10 replacement work) based on the contact from the system manager (FIG. 11, (e)). The controllers 24 and 34 of the parallel processing apparatus 100 light on the LEDs 26 and 36 based on the fact that a new AOC 10 has been coupled with the system boards 20 and 30 (FIG. 11, (f)). The light-on states of the LEDs 26 and 36 are an example of a coupling indication state indicating that the AOC 10 has been coupled to the system boards 20 and 30. The controllers 24 and 34 light off the LEDs 26 and 36 based on detection of a fact that the new AOC 10 has been normally coupled (FIG. 11, (g)). In other words, for example, the parallel processing apparatus 100 executes the operations illustrated in FIGS. 9 and 10. The light-off states of the LEDs 26 and 36 after the new AOC 10 has been coupled are an example of a normal indication state indicating that the coupling of the AOC 10 is normal.

When the LEDs 26 and 36 are temporarily lighted on and then are lighted off upon coupling of the AOC 10 to the system boards 20 and 30, the maintenance staff may recognize that the AOC 10 has been coupled normally at a correct position. The maintenance staff contacts and informs the system manager of completion of the maintenance of the AOC 10 (FIG. 11, (h)). The system manager operates the terminal of the management device 50 and reboots the system boards 20 and 30 with which the AOC 10 is replaced (FIG. 11, (i)). Then, the normal operation of the parallel processing apparatus 100 using the system boards 20 and 30 is restarted.

In the lower maintenance sequence in FIG. 11, the operations and processing up to start of the maintenance of the AOC 10 by the maintenance staff is the same as those in the upper sequence in FIG. 11. In the lower sequence in FIG. 11, the maintenance staff removes the failing AOC 10 from the system board 20 and 30 and then one end of a new AOC 10 is coupled to a system board other than the system boards 20 and 30 by mistake. In other words, for example, improper coupling of the AOC 10 occurs (FIG. 11, (j)).

For example, when a new AOC 10 is coupled to the system board 20 and a system board other than the system board 30, the CPUs 22a and 22b are coupled to CPUs other than the CPUs 32a and 32b through the AOC 10. The LED 26 over the system board 20 is lighted on once based on the coupling of the new AOC 10 (FIG. 11, (k)). However, a coupling abnormality of the AOC 10 is detected through the exchange of the coordinate information between the CPUs after that, and the LED 26 blinks (FIG. 11, (l)). In other words, for example, the parallel processing apparatus 100 executes the operations illustrated in FIGS. 9 and 10. The blinking states of the LEDs 26 and 36 after the new AOC 10 has been coupled are an example of an error indication state indicating that the coupling of the AOC 10 is wrong. The LED 36 of the system board 30 to which the new AOC 10 is not coupled is kept having a light-off state.

From the blinking state of the LED 26, the maintenance staff may recognize on the spot that the AOC 10 has been coupled to a wrong destination without waiting for the contact from the system manager. Then, the maintenance staff couples the AOC 10 to the original system boards 20 and 30 again. Thus, the parallel processing apparatus 100 executes the operations illustrated in FIGS. 9 and 10 and lights on and then lights off the LEDs 26 and 36 (FIG. 11, (m) and (n)). Based on the light-off states of the LEDs 26 and 36, the maintenance staff recognizes the AOC 10 has been normally coupled to the correct positions and contacts and informs the system manager of completion of the maintenance of the AOC 10 (FIG. 11, (o)). The system manager operates the terminal of the management device 50 and reboots the system boards 20 and 30 having the replaced AOC 10 (FIG. 11, (p)). Then, the normal operation of the parallel processing apparatus 100 using the system boards 20 and 30 is restarted.

Figure 12:
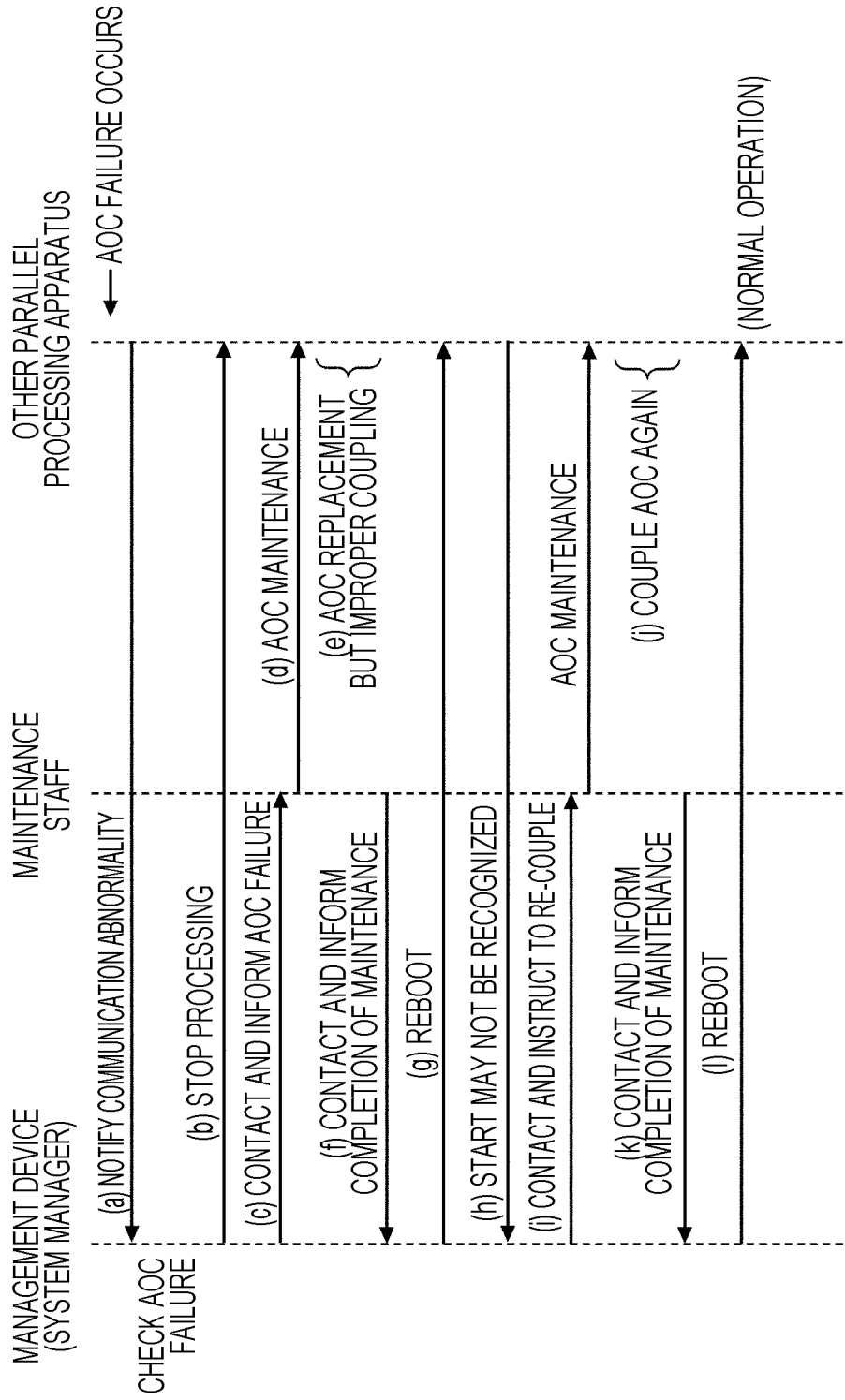
FIG. 12 is a diagram illustrating an example of operations of another parallel processing apparatus.

FIG. 12 illustrates an example of operations to be performed by another parallel processing apparatus. The maintenance sequence illustrated in FIG. 12 is not publicly known. The maintenance sequence illustrated in FIG. 12 corresponds to the lower maintenance sequence in FIG. 11. In other words, for example, in a case where an AOC failure occurs and the failing AOC is to be replaced by a new AOC, improper coupling of the new AOC occurs. Detailed description of processing and operations that are similar to those illustrated in FIG. 11 is omitted.

First, if an AOC channel failure is detected, the parallel processing apparatus notifies the management device that an abnormality has occurred in a communication using the AOC (FIG. 12, (a)). The management device displays the occurrence of the communication abnormality (alarm) on the display. When the system manager who manages operations of the parallel processing apparatus decides an AOC failure based on the alarm displayed on the display screen of the management device, the system manager issues a stop instruction to stop operations of the system boards coupled to the AOC (FIG. 12, (b)).

The system manager further contacts and informs the maintenance staff who performs a maintenance work on the parallel processing apparatus that the AOC has been failed (FIG. 12, (c)). The maintenance staff executes the maintenance work on the AOC (replacement work) based on the contact from the system manager (FIG. 12, (d)). However, the maintenance staff couples the AOC to a wrong system board, and improper coupling occurs (FIG. 12 (e)).

Because the other parallel processing apparatus does not have the LEDs 26 and 36 illustrated in FIG. 1, the maintenance staff does not notice the improper coupling and contacts and informs the system manager of completion of the maintenance of the AOC (FIG. 12, (f)). The system manager reboots the system boards having the AOC 10 that supposed to have been replaced (FIG. 12, (g)). However, because the AOC is not coupled to the correct system board, the booting is not normally executed, and the system manager may not confirm completion of the booting (link up) (FIG. 12, (h)).

The system manager operates the terminal and checks the state of the parallel processing apparatus and decides that the booting failure is caused by the improper coupling of the AOC 10. Therefore, the system manager contacts and instructs the maintenance staff to couple the AOC again by informing the part having the wrong AOC coupling (FIG. 12, (i)). The maintenance staff having received the contact executes a maintenance work that couples the AOC again (FIG. 12, (j)).

The maintenance staff contacts and informs the system manager of completion of the maintenance of the AOC (FIG. 12, (k)). The system manager reboots the system boards having the replaced AOC 10 (FIG. 12, (l)). Then, the normal operation of the parallel processing apparatus using the system boards is restarted.

In the other parallel processing apparatus without the LEDs 26 and 36 that indicate whether the AOC coupling is normal or not, it is difficult for the maintenance staff to notice the improper AOC coupling. Thus, the system manager is required to contact the maintenance staff twice for maintenance and is required to check whether the cause of the suppression of rebooting is the improper AOC coupling. Therefore, the time from the occurrence of the AOC failure to the normal operation of the parallel processing apparatus is longer than the case illustrated in FIG. 11.

On the other hand, according to the maintenance sequence illustrated in FIG. 11, because the improper coupling of the AOC 10 may be confirmed by the maintenance staff, the system manager may not check the display and contact the maintenance staff about the improper coupling of the AOC 10. Therefore, the time from the occurrence of the AOC 10 failure to the normal operation of the parallel processing apparatus 100 may be reduced, and the burden on the system manager may be reduced.

Figure 13:
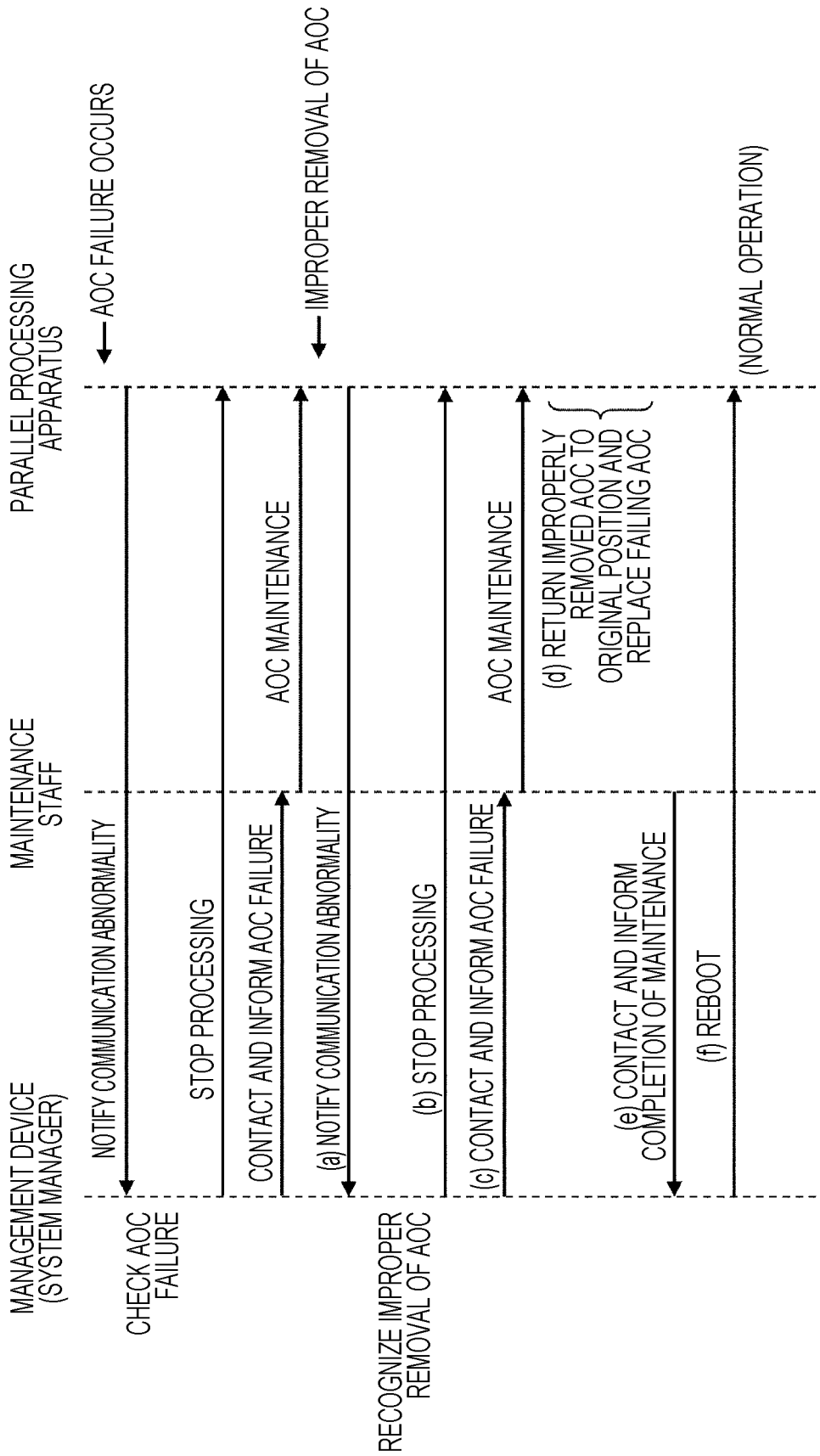
FIG. 13 is a diagram illustrating another example of operations of the other parallel processing apparatus.

FIG. 13 illustrates another example of the operations to be performed by another parallel processing apparatus. The maintenance sequence illustrated in FIG. 13 is not publicly known. In the maintenance sequence illustrated in FIG. 13, a maintenance staff improperly removes an AOC that is normally operating and that is not a failing AOC. Detailed description of processing and operations that are similar to those illustrated in FIGS. 11 and 12 is omitted. The operations and processing until the start of the first AOC maintenance by the maintenance staff are the same as those illustrated in FIG. 12.

If a normal AOC is improperly removed and the communication using the AOC thus shuts down, the parallel processing apparatus notifies the management device that an abnormality has occurred in the communication using the AOC (FIG. 13, (a)). When the system manager decides an AOC failure based on the alarm indicating a communication abnormality displayed on the display screen of the management device, the system manager issues a stop instruction to stop operations of the system boards coupled to the AOC (FIG. 13, (b)).

The system manager contacts and informs the maintenance staff that an AOC that is different from the AOC that has failed last time has a failure (FIG. 13, (c)). Based on the contact from the system manager, the maintenance staff checks the coupling state of the AOCs and notices a different AOC has been improperly removed, for example. The improperly removed AOC is inserted back, and the work for replacing the failing AOC is executed (FIG. 13, (d)).

The maintenance staff contacts and informs the system manager of completion of the maintenance of the AOC (FIG. 13, (e)). The system manager reboots the system board to which the improperly removed AOC is inserted back and the system board in which the AOC is replaced (FIG. 13, (f)). Then, the normal operation of the parallel processing apparatus using the system boards is restarted.

In the parallel processing apparatus 100 illustrated in FIG. 1, a fault as illustrated in FIG. 13 does not occur. In the parallel processing apparatus 100, the LEDs 26 and 36 corresponding to the AOC 10 including a failing channel CH are lighted off when the communication using the AOC 10 stops and the AOC 10 is replaceable. Then, the maintenance staff removes the AOC 10 corresponding to the lighting-off LEDs 26 and 36 as the AOC 10 to be replaced, and a new AOC 10 is coupled. LEDs 26 and 36 corresponding to the AOC 10 that is normally operating have a light-on state. Therefore, there is a low possibility that the AOC 10 corresponding to the lighting-on LEDs 26 and 36 is removed by mistake. When a link-down AOC 10 that is not normally operating (with the corresponding LEDs 26 and 36 having a light-off state) is removed by mistake, no communication abnormality occurs. Therefore, an abnormality is notified from the parallel processing apparatus 100 to the management device 50.

As described above, according to the embodiment illustrated in FIG. 1 to FIG. 13, both of the controllers 24 and 34 of the system boards 20 and 30 coupled through the AOC 10 cause the CPUs 22 and 32 to stop the use of the AOC 10 based on detection of a channel failure in one of the CPUs 22 and 32. Thus, for example, not only the CPU 22 from which a channel failure has been detected but also all of the CPUs 22 and 32 using the failing AOC 10 may be caused to stop use of the AOC 10. Therefore, the AOC 10 may be changed to a replaceable state automatically without human assistance.

Based on the light-off states of both of the LEDs 26 and 36 corresponding to a failing AOC 10, the maintenance staff who maintains the AOC 10 may confirm that the communication using the AOC 10 has been stopped and may start the replacement work for the AOC 10. In this case, because the AOC 10 corresponding to the LEDs 26 and 36 having a light-off state may be removed, improper removal of another normal AOC 10 may be suppressed. This means that the shutdown of the normally operating link due to an operational error by the maintenance staff may be suppressed, and reduction of the reliability of the parallel processing apparatus 100 may be suppressed.

In this manner, because the AOC 10 maintenance work may be executed with reliability and without mistake, the efficiency of the AOC 10 maintenance work may be improved, compared with the other parallel processing apparatuses without the LEDs 26 and 36. Thus, the period of operation stop of the parallel processing apparatus 100 may be minimized, and the reduction of the processing performance of the parallel processing apparatus 100 may be suppressed.

Also when both of the channels CHa1 and CHa2 used for transmission by the CPU 22a have failures, the channel failures may be notified to the system board 30 through the other CPU 22b. Thus, both of the CPUs 22 and 32 of the system boards 20 and 30 may be stopped to use the AOC 10.

In the AOC 10 replacement work, based on coupling of a new AOC 10 to the system board 20, the controller 24 causes the CPU 22 to exchange coordinate information with the CPU 32 and causes the LED 26 to display information indicating whether the AOC 10 is coupled to the correct couplers 28 and 38 or not. Thus, the maintenance staff may recognize that the AOC 10 is coupled to a wrong position by himself and may couple the AOC 10 again. Therefore, the time for the maintenance may be reduced compared with a case without using the LED 26, and the stop time of the operation of the parallel processing apparatus 100 may be minimized.

Because each CPU holds coordinate information of other CPUs directly connected thereto over a computer network, whether the CPU is coupled to the correct CPU through the AOC 10 or not may be determined by receiving coordinate information from the CPU coupled through the AOC 10. Because whether the CPU coupling is correct or not may be determined for each of the CPUs, the loads on the controllers 24 and 34 may be reduced.

Figure 14:
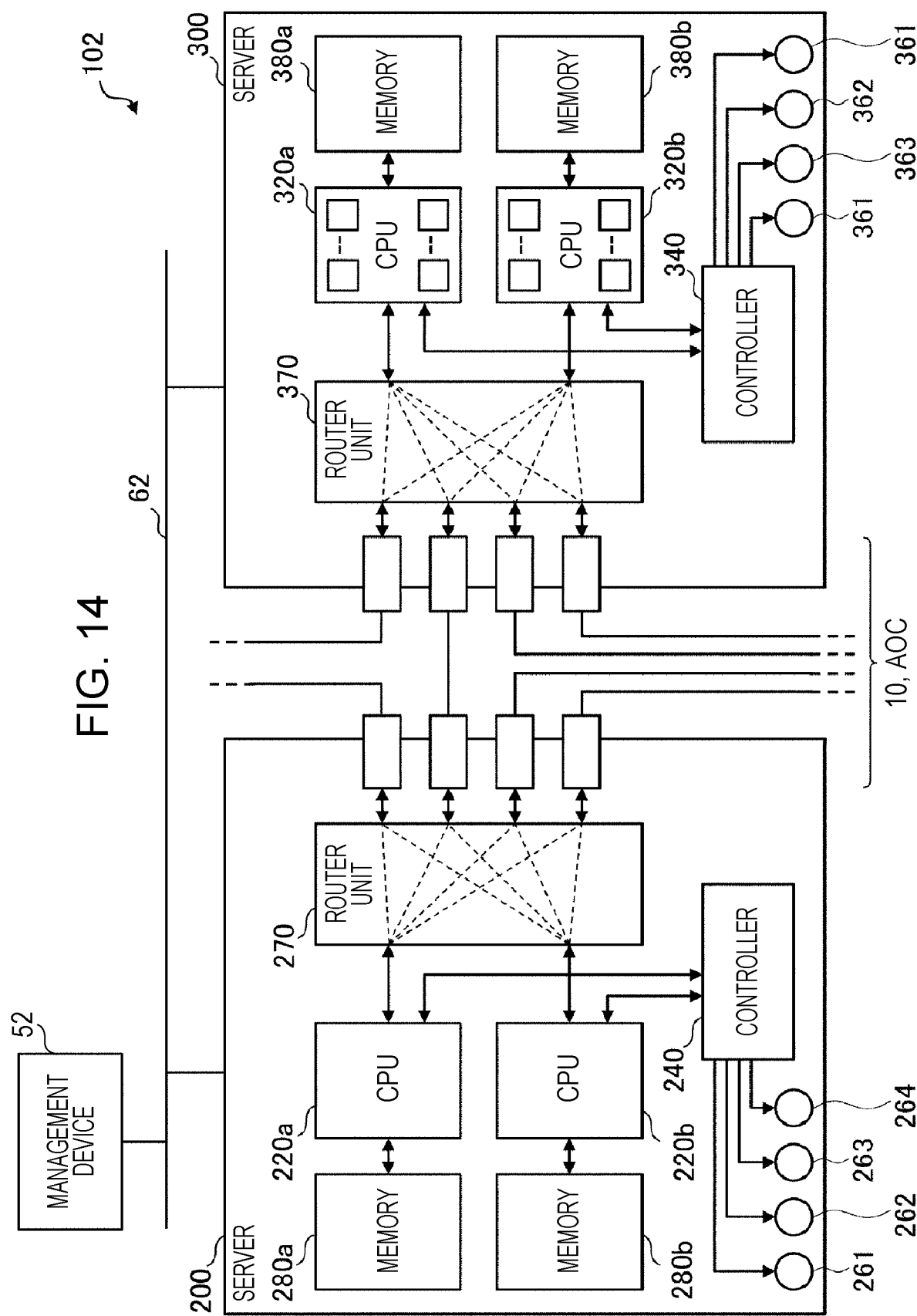
FIG. 14 is a diagram illustrating an example of a parallel processing apparatus according to another embodiment.

FIG. 14 is a diagram illustrating an example of a parallel processing apparatus according to another embodiment. A parallel processing apparatus 102 illustrated in FIG. 14 has a plurality of servers 200 and 300 coupled through a plurality of AOCs 10 each having a plurality of channels. Four AOCs 10 are coupled to each of the servers 200 and 300. For example, the server 200 is coupled to the server 300 and other three servers, not illustrated, through the AOCs 10, and the server 300 is coupled to the server 200 and other three servers, not illustrated, through the AOCs 10. For example, the AOCs 10 are the same as the AOC 10 illustrated in FIG. 2.

The server 200 has a plurality of CPUs 220 (220a, 220b), a controller 240, a router unit 270, memories 280 (280a, 280b), and LEDs 26 (261, 262, 263, 264). The server 300 has a plurality of CPUs 320 (320a, 320b), a controller 340, a router unit 370, memories 380 (380a, 380b), and LEDs 36 (361, 362, 363, 364). The servers 200 and 300 and other servers, not illustrated, are coupled, over a network 62, to a management device 52 that manages the parallel processing apparatus 102 overall. The server 200 may have three or more CPUs 220, and the server 300 may have three or more CPUs 320.

CPUs 220 and 320 are examples of a processor and have the same functionality as that of the CPUs 22 and 32 illustrated in FIG. 1. Each of the CPUs 220 and 320 functions as one node over a computer network. Each of the servers 200 and 300 is an example of an information processing apparatus. Each of the LEDs 26 and 36 is an example of a display and is the same as the LEDs 26 and 36 illustrated in FIG. 1, for example.

The four LEDs 261, 262, 263, and 264 are provided correspondingly to the four AOCs 10 coupled to the server 200 and emit green light when lighted on. Also, the four LEDs 361, 362, 363, and 364 are provided correspondingly to the four AOCs 10 coupled to the server 300 and emit green light when lighted on. Like the displays 26 and 36 illustrated in FIG. 1, the LEDs 26 and 36 are lighted on when the corresponding AOC 10 may operate normally, are lighted off when the AOC 10 is replaceable, and blink when the AOC 10 is not correctly coupled. When the AOC 10 is not correctly coupled, the coordinates of the two CPUs coupled to each other through the AOC 10 may be different from the expected values of the coordinates over the computer network, indicating that the AOC 10 is improperly coupled.

The router unit 270 couples each of the CPU 220a and 220b to one of the four AOCs 10 in accordance with the communication destination node of a packet, for example. The router unit 370 couples each of the CPUs 320a and 320b to one of the four AOCs 10 in accordance with the communication destination node of a packet, for example. For example, the AOC 10 coupling the servers 200 and 300 mutually is shared by the two CPUs 220a and 220b and two CPUs 320a and 320b, like the case in FIG. 2. The functionality of the router unit 270 may be internally provided in the CPUs 220a and 220b, and the functionality of the router unit 370 may be internally provided in the CPUs 320a and 320b.

The memory 280a is coupled to the CPU 220a, and the memory 280b is coupled to the CPU 220b. The memory 380a is coupled to the CPU 320a, and the memory 380b is coupled to the CPU 320b. For example, the memories 280 and 380 are main storage memories used by the CPUs 220 and 320.

The controllers 240 and 340 are examples of the controller, and have the same functionality as that of the controllers 24 and 34 illustrated in FIG. 1. The controller 240 controls operations of the CPUs 220a and 220b and controls display operations of the four LEDs 26. The controller 340 controls operations of the CPUs 320a and 320b and controls display operations of the four LEDs 36. The controllers 240 and 340 execute a control program to execute operations illustrated in FIGS. 8 and 9. However, the controller 240 executes a control to light on, light off or blink the four LEDs 26 corresponding to the AOC 10 including a failing channel. The controller 340 executes a control to light on, light off or blink the four LEDs 36 corresponding to the AOC 10 including a failing channel.

The CPUs 220 and 320 execute a control program to execute operations illustrated in FIGS. 6, 7, and 10 separately from a processing program that executes information processing. The parallel processing apparatus 102 executes operations similar to the operations illustrated in FIGS. 4, 5, and 11.

Also according to the embodiment illustrated in FIG. 14, the same effect as that of the embodiment illustrated in FIGS. 1 to 13 may be obtained.

Figure 15:
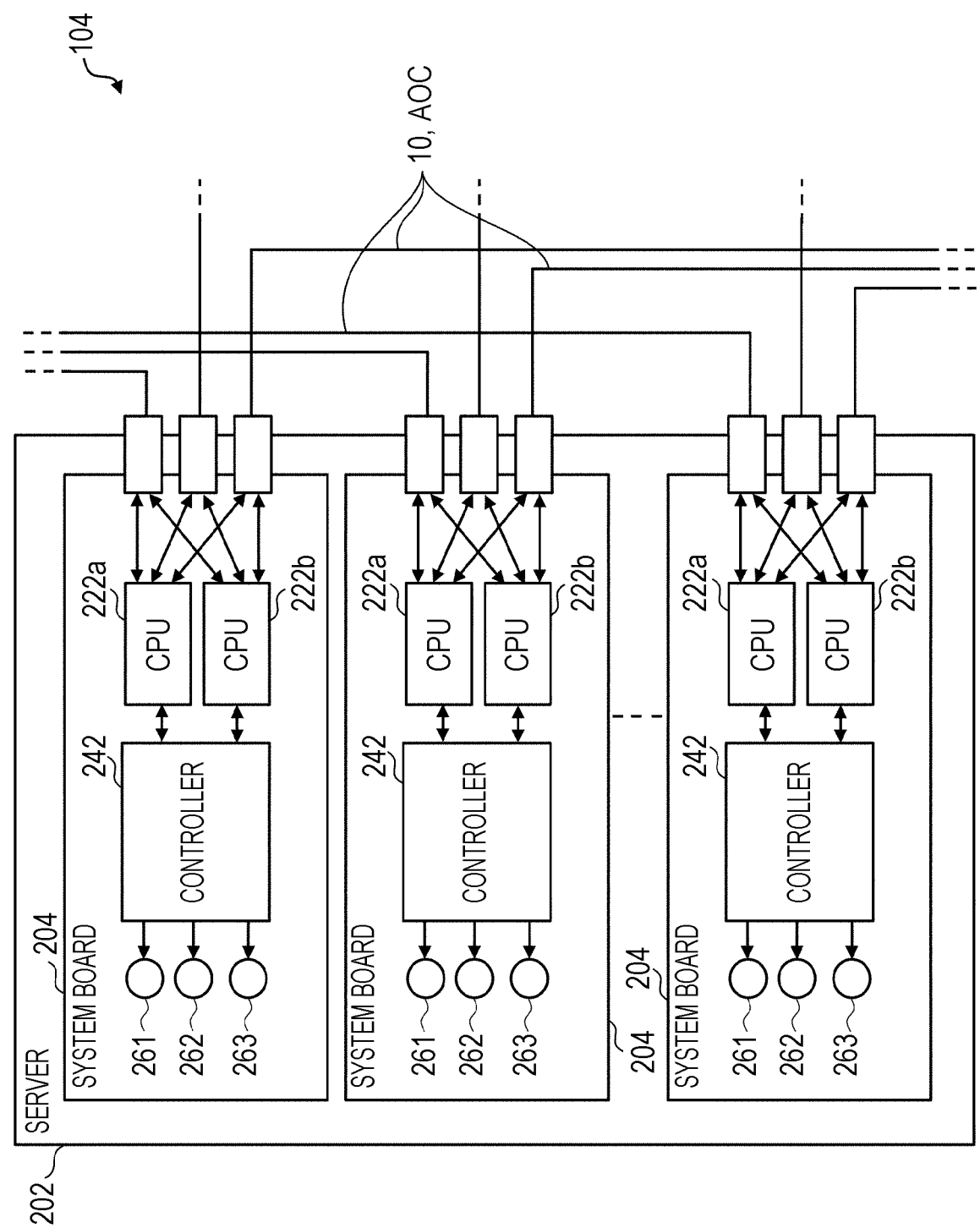
FIG. 15 is a diagram illustrating an example of the parallel processing apparatus according to another embodiment.

FIG. 15 illustrates an example of a parallel processing apparatus according to another embodiment. A parallel processing apparatus 104 illustrated in FIG. 15 has a plurality of servers 202 (one of which is illustrated in FIG. 15) coupled through a plurality of AOCs 10 each having a plurality of channels. Nine AOCs 10 are coupled to each of the servers 202. Each of the servers 202 is an example of an information processing apparatus.

Each of the servers 202 has three system boards 204 correspondingly coupled to three AOCs 10. Each of system boards 204 has two CPUs 222 (222a, 222b), a controller 242 that controls operations of the two CPUs 222, and LEDs 26 (261, 262, 263) corresponding to the three AOCs 10. Each of the system boards 204 may have three or more CPUs 222.

CPUs 222 are examples of a processor and have the same functionality as that of the CPUs 22 and 32 illustrated in FIG. 1. Each of the CPUs 222 functions as one node over a computer network. Each of the servers 202 is an example of an information processing apparatus. Each of the LEDs 26 is an example of a display and emits green light when lighted on like the LEDs 26 and 36 illustrated in FIG. 1, for example. Like the displays 26 and 36 illustrated in FIG. 1, the LEDs 26 are lighted on when the corresponding AOC 10 may operate normally, are lighted off when the AOC 10 is replaceable, and blink when the AOC 10 is not correctly coupled.

The controllers 242 are examples of a controller and have the same functionality as that of the controllers 24 and 34 illustrated in FIG. 1. The controllers 242 execute a control program to execute operations illustrated in FIGS. 8 and 9. However, the controllers 242 execute a control to light on, light off or blink the three LEDs 26 corresponding to the AOC 10 including a failing channel.

The CPUs 222 execute a control program to execute operations illustrated in FIGS. 6, 7, and 10 separately from a processing program that executes information processing. The parallel processing apparatus 104 executes operations similar to the operations illustrated in FIGS. 4, 5, and 11.

The parallel processing apparatus has information processing apparatuses coupled mutually through an optical transmission line having a plurality of channels. Each of the information processing apparatuses has a plurality of processors allocated to the plurality of channels of the optical transmission line, a controller and a display. When one of the processors detects a channel failure, the processor notifies a processor in the other information processing apparatus of the channel failure, notifies the controller of the information processing apparatus of the channel failure and notifies the controller of the information processing apparatus of the notification of the channel failure from the other information processing apparatus. The controller causes the processor of the information processing apparatus to stop use of the failing optical transmission line based on reception of the notification of the channel failure and sets the display corresponding to the failing optical transmission line to have a stop indication state indicating that communication through the optical transmission line has stopped.

Thus, also according to the embodiment illustrated in FIG. 15, the same effect as that of the embodiment illustrated in FIGS. 1 to 14 may be obtained.

With the detailed description having been described, the features and advantages of the embodiments will become apparent. This is intended to extend to the features and advantages of the embodiments as described above as long as the claims are not departing from the gist of the claims and the scope of right. Also, one skilled in the art is able to easily make any modifications and changes. Accordingly, it is not intended to limit the scope of the patentable embodiments to the above description. The patentable embodiments are also able to be based on appropriate improvement or equivalents included in the scope of the disclosure in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A parallel processing apparatus comprising:
information processing apparatuses coupled mutually through an optical transmission line having a plurality of channels, wherein each of the information processing apparatuses has
a plurality of processors that shares the optical transmission line having the plurality of channels allocated to the plurality of processors;
a controller coupled to the information processing apparatus; and
a display provided correspondingly to the optical transmission line,
wherein when a first processor of the plurality of processors detects a failure of a channel, the first processor notifies the channel failure to a second processor of the plurality of the processors of the another information processing apparatus by using a channel that is not failed, notifies the channel failure to the controller of the information processing apparatus and, when the first processor receives a notification of the channel failure from the another information processing apparatus, notifies the channel failure to the controller of the information processing apparatus, and
wherein the controller of each of the information processing apparatuses detects a processor of the information processing apparatus using a failing optical transmission line including the failing channel based on reception of the notification of the channel failure, causes the detected processor to stop use of the failing optical transmission line, and, based on the stop of the use of the failing optical transmission line by the detected processor, sets the display corresponding to the failing optical transmission line to have a stop indication state indicating that communication through the failing optical transmission line has stopped.

2. The parallel processing apparatus according to claim 1, wherein, when the first processor of the plurality of processors cannot be notified to one of the plurality of processors in the another information processing apparatus to the channel failure due to a failure of a channel, the first processor requests a processor other than the first processor of the information processing apparatus for notification of the channel failure to the another information processing apparatus, and
wherein the processor other than the first processor notifies one of the plurality of processors in the another information processing apparatus of the channel failure.

3. The parallel processing apparatus according to claim 1, wherein the stop indication states of both of the displays of the information processing apparatuses coupled to the failing optical transmission line including a failing channel indicate that the failing optical transmission line corresponding to the displays is replaceable.

4. The parallel processing apparatus according to claim 1, wherein the controller
when coupling of the optical transmission line to the information processing apparatus is detected, sets the display corresponding to the coupling-detected optical transmission line to a coupling indication state indicating that the optical transmission line has been coupled,
requests the detected processor of the information processing apparatus sharing the coupling-detected optical transmission line to obtain coordinate information indicating a position of a communication destination processor over a computer network including a plurality of processors from the communication destination processor,
when the coordinate information obtained in response to the request is correct, sets the display to a normal indication state indicating that the coupling of the optical transmission line is normal, and
when the coordinate information obtained in response to the request is wrong, sets the display to an error indication state indicating that the coupling of the optical transmission line is wrong.

5. The parallel processing apparatus according to claim 4, wherein each of the plurality of processors
holds coordinate information indicating a position over the computer network with respect to another processors coupled to a processor of the plurality of processors over the computer network, and
when a request for obtaining coordinate information is received from the controller, obtains coordinate information from the communication destination processor and notifies the controller of the information processing apparatus whether the obtained coordinate information is correct.

6. The parallel processing apparatus according to claim 1, wherein the controller causes the detected processor from which the use of the optical transmission line is detected to stop execution of a job so that the use of the optical transmission line is stopped.

7. The parallel processing apparatus according to claim 1, wherein each of the plurality of processors is coupled to information processing apparatuses different from each other through a plurality of optical transmission lines.

8. The parallel processing apparatus according to claim 1, wherein the optical transmission line has
a plurality of optical fibers corresponding to the plurality of channels; and
a plurality of couplers each provided at both ends of the plurality of optical fibers, including an interface that converts an electric signal from the information processing apparatus to an optical signal and outputs the optical signal to the optical fiber and converts an optical signal from the optical fiber to an electric signal and outputs the electric signal to the information processing apparatus and removably coupled to the coupler provided in the information processing apparatus.

9. A replacing method of a failing optical transmission line coupled between information processing apparatuses coupled mutually through an optical transmission line having a plurality of channels, each of the information processing apparatuses having a plurality of processors that shares the optical transmission line having the plurality of channels allocated to the plurality of processors; a controller being coupled to the information processing apparatus; and a display being provided correspondingly to the optical transmission line, the method comprising:
when a first processor of the plurality of processors detects a failure of a channel, notifying the channel failure to a second processor of the plurality of the processors of the another information processing apparatus by using a channel that is not failed, notifying the channel failure to the controller of the information processing apparatus and, when the first processor receives a notification of the channel failure from the another information processing apparatus, notifying the channel failure to the controller of the information processing apparatus; and detecting a processor of the information processing apparatus using a failing optical transmission line including the failing channel based on reception of the notification of the channel failure, causing the detected processor to stop use of the failing optical transmission line, and, based on the stop of the use of the failing optical transmission line by the detected processor, setting the display corresponding to the failing optical transmission line to have a stop indication state indicating that communication through the failing optical transmission line has stopped; and replacing the failing optical transmission line with a normal optical transmission line based on the stop indication state on the display.

10. A replacing method according to claim 9 after replacing the failing optical transmission line, requesting the detected processor of the information processing apparatus sharing the coupling-detected optical transmission line to obtain coordinate information indicating a position of a communication destination processor over a computer network including a plurality of processors from the communication destination processor, and notifying the controller of the information processing apparatus whether the obtained coordinate information is correct.

* * * * *